United States Patent [19]

Shiotani et al.

[11] Patent Number: 5,282,408
[45] Date of Patent: Feb. 1, 1994

[54] TABLE SAW

[75] Inventors: Takeshi Shiotani; Kouichi Miyamoto; Kunio Tsugami; Mitsumasa Sato; Tatsuya Wada, all of Tokyo, Japan

[73] Assignee: Ryobi Limited, Hiroshima, Japan

[21] Appl. No.: 46,935

[22] Filed: Apr. 13, 1993

Related U.S. Application Data

[60] Continuation of Ser. No. 856,113, Mar. 23, 1992, abandoned, which is a division of Ser. No. 781,639, Oct. 25, 1991, Pat. No. 5,116,249, which is a continuation of Ser. No. 564,770, Aug. 9, 1990, abandoned.

[30] Foreign Application Priority Data

| | | | |
|---|---|---|---|
| Aug. 11, 1989 | [JP] | Japan | 1-209061 |
| Aug. 28, 1989 | [JP] | Japan | 1-100291 |
| Aug. 28, 1989 | [JP] | Japan | 1-100292 |
| Aug. 30, 1989 | [JP] | Japan | 1-101646 |
| Aug. 30, 1989 | [JP] | Japan | 1-101647 |
| Dec. 8, 1989 | [JP] | Japan | 1-142196 |

[51] Int. Cl.5 ............... B26D 7/06; B26D 7/01
[52] U.S. Cl. ............... 83/432; 83/435.1; 83/477; 83/468.3; 83/522.18
[58] Field of Search ............ 83/471.3, 468.3, 432, 83/435.1, 477, 477.2, 468.7, 522.18; 144/287

[56] References Cited

U.S. PATENT DOCUMENTS

| | | | |
|---|---|---|---|
| 2,789,596 | 4/1957 | Barnes et al. | 83/468.3 X |
| 3,344,819 | 10/1967 | Mitchell | 83/477.2 X |
| 3,841,188 | 10/1974 | Winter | 83/477.2 X |
| 4,133,237 | 1/1979 | Lewin | 83/468.3 |
| 4,213,364 | 7/1980 | Sahlin | 83/471.3 |
| 4,693,156 | 9/1987 | Olvera | 83/432 X |
| 4,974,306 | 12/1990 | Cole et al. | 83/435.1 X |

Primary Examiner—Hien H. Phan
Assistant Examiner—Kenneth E. Peterson
Attorney, Agent, or Firm—Oliff & Berridge

[57] ABSTRACT

A table saw has a circular saw table, a miter table and a supplementary table to form a working table, on the front and rear sides of which two guide rails are disposed slidably with respect to the working table. The miter table has a miter fence thereon whose pivot points are provided at two separate positions.

16 Claims, 35 Drawing Sheets

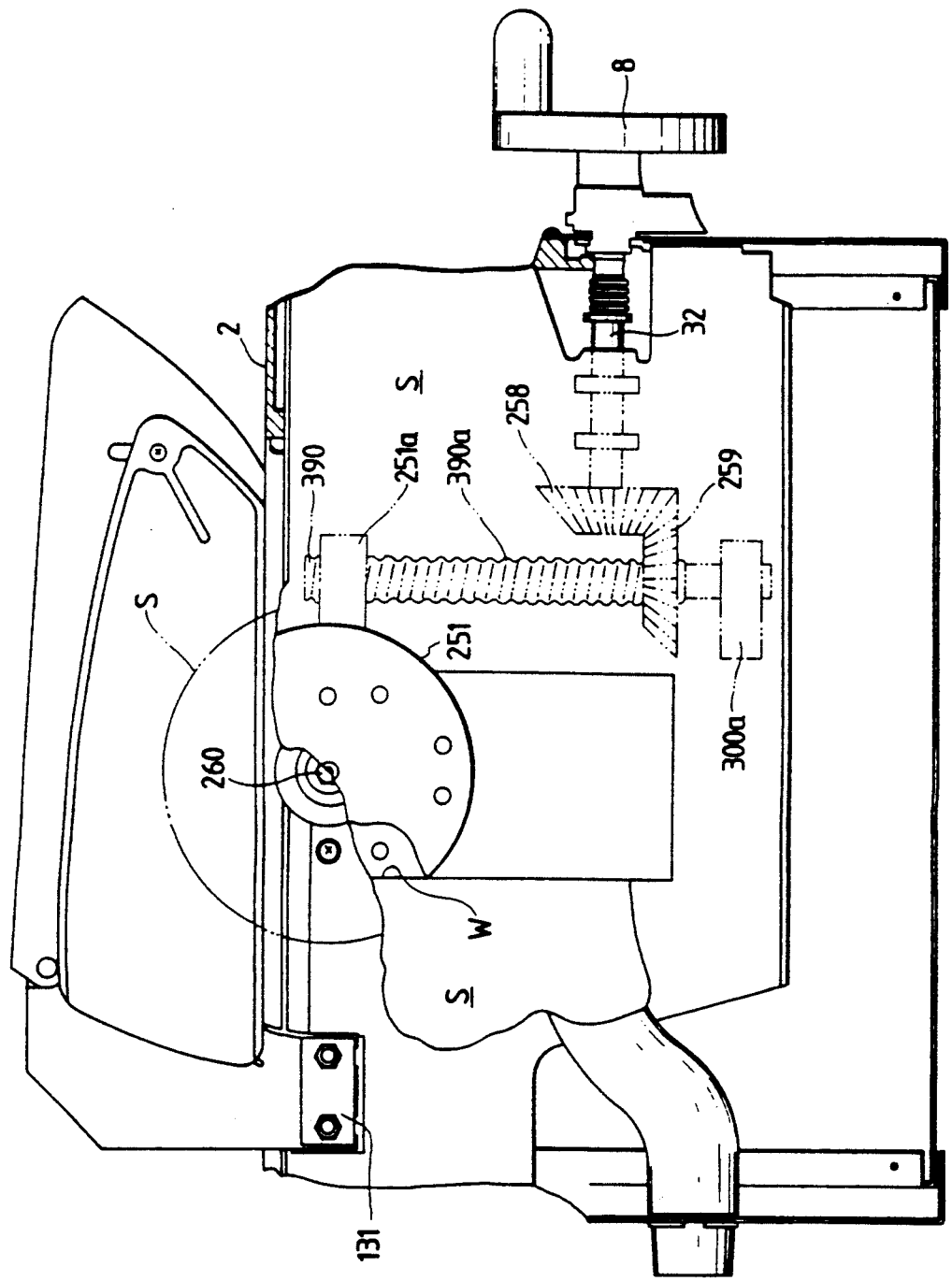

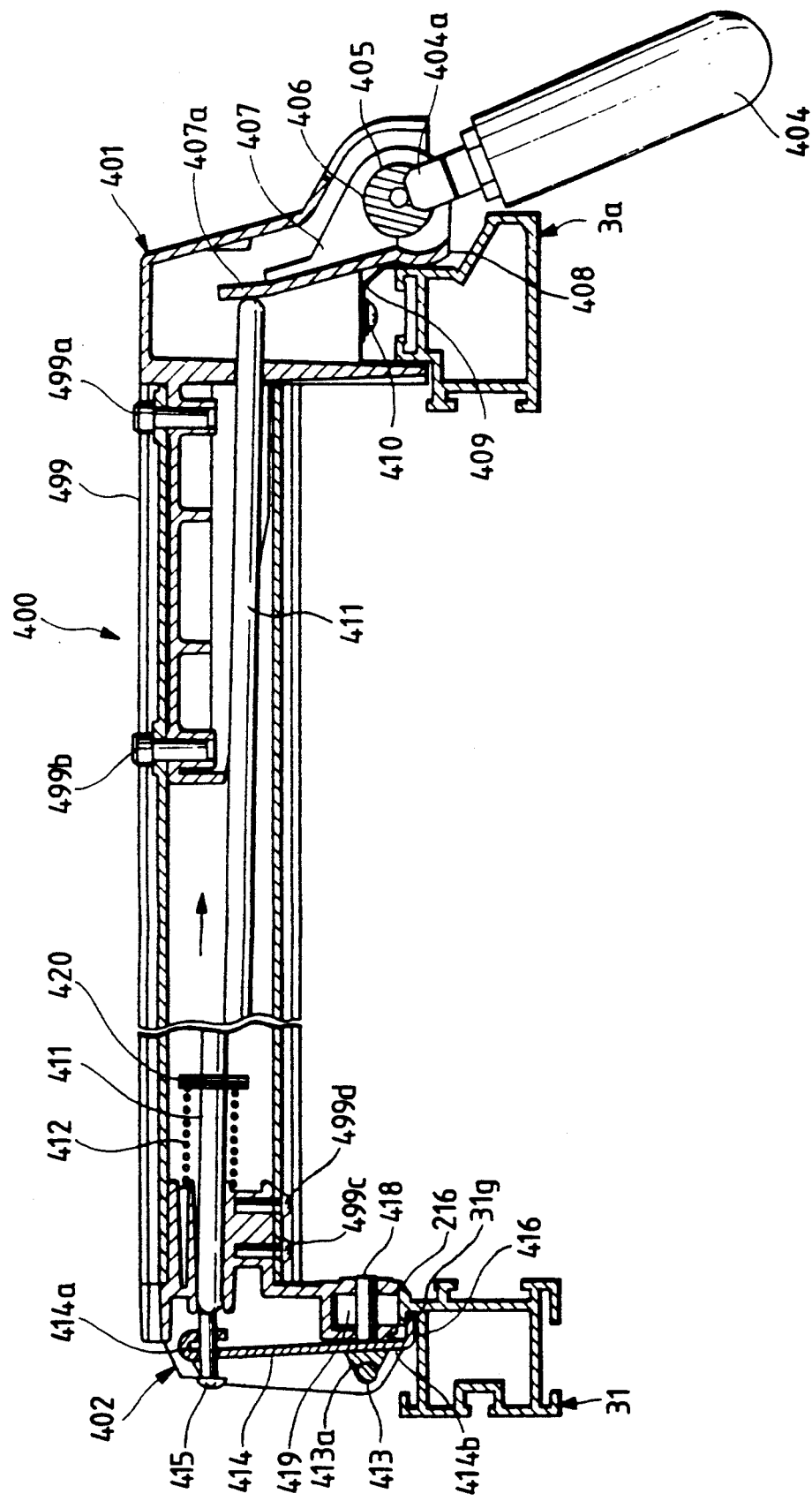

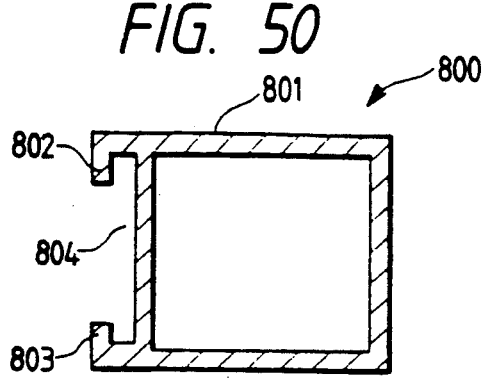
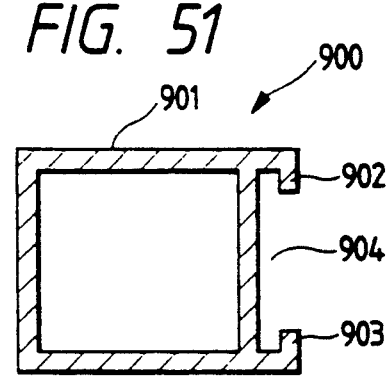
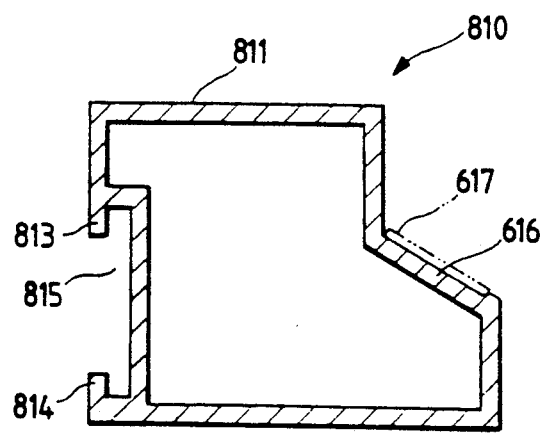
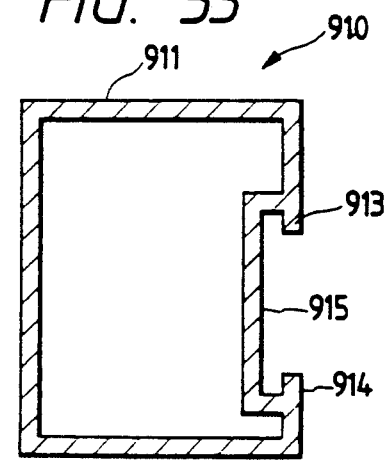
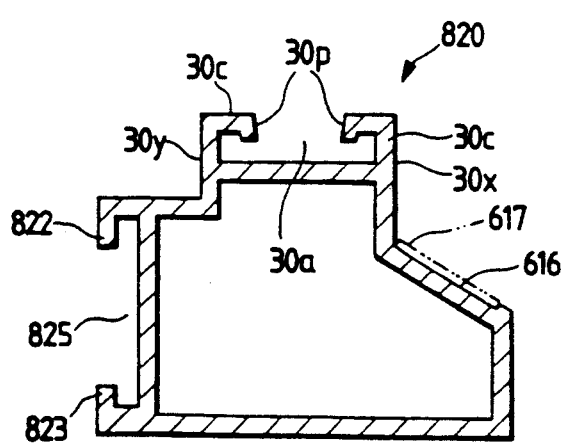
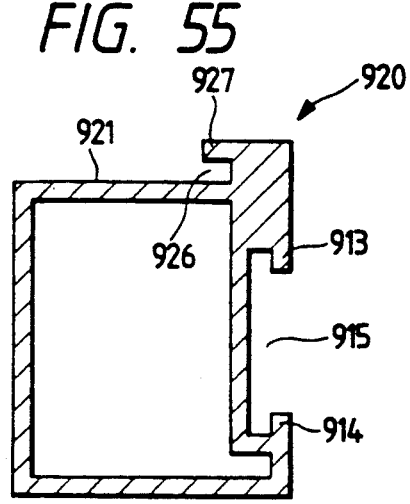

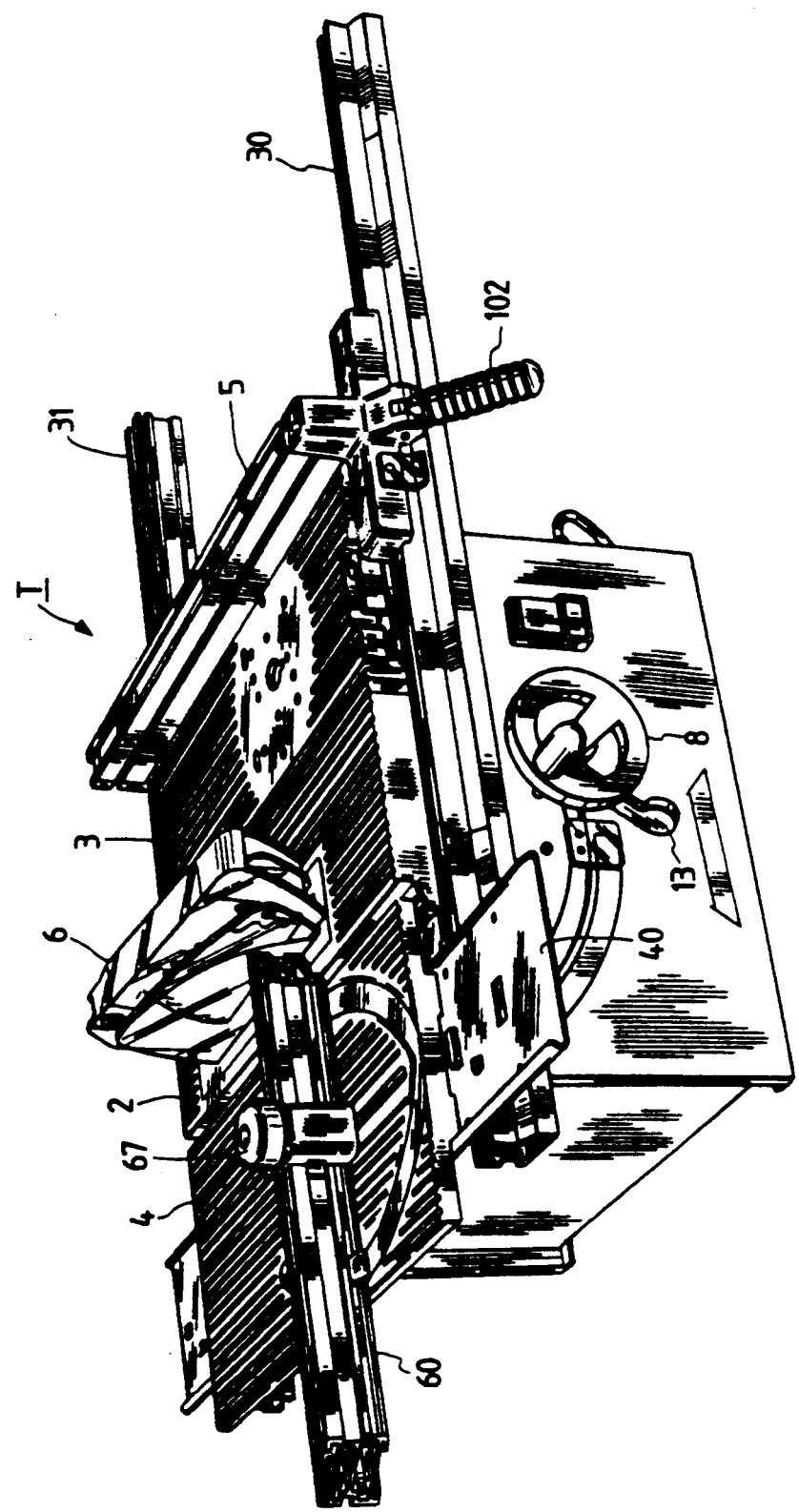

TABLE SAW

This is a continuation of application Ser. No. 07/856,113 filed Mar. 23, 1992, now abandoned, which in turn is a division of application Ser. No. 07/781,639 filed Oct. 25, 1991, which issued as U.S. Pat. No. 5,116,249 on May 26, 1992, which in turn is a continuation of application Ser. No. 07/564,770, filed Aug. 9, 1990, now abandoned.

BACKGROUND OF THE INVENTION

This invention relates to a table saw for working various materials with a rotary circular saw.

Generally, a table saw for cutting various works has a circular saw table for supporting a circular saw, on one side of which a miter table having a miter fence for guiding a work to be cut is provided, and on the other side of which a supplementary table for supporting the work to be cut is provided. A lip fence for determining the cutting length of the work is also provided on the table saw.

However, the supplementary table of the conventional table saw is fixed to a working table. Further, the miter table can be moved in the front and rear directions as viewed from an operator and, however, the miter table cannot be moved in the lateral (left and right) direction as viewed from the operator. In this manner, since the two tables cannot be moved on the lateral direction from a predetermined position, when a long work is cut, the work cannot be reliably supported by the working table including the miter table, supplementary table and the saw table.

Further, in the conventional table saw, since there is no case that the miter table is moved in the lateral direction and the miter table is always maintained on the same side with respect to the saw table, the miter fence is rotated at a pivot point on one side of the miter table. Accordingly, when the miter table is moved from one side of the saw table to the opposite side thereof, the miter fence cannot be effectively used.

SUMMARY OF THE INVENTION

It is an object of this invention to provide a table saw which can reliably support a long work to be cut to facilitate working of the work and has a wide applicability to cope with various forms or shapes of the work.

According to one aspect of this invention, there is provided a table saw having a circular saw table for supporting a circular saw for cutting a work, a miter table disposed adjacent to said circular saw table and having a miter fence thereon for guiding said work to said circular saw and a supplementary table cooperating with said two tables for supporting said work, said three tables being disposed so as to form a working table, wherein a pair of guide rails are disposed laterally on the front and rear sides of said working table, respectively, and said miter table and supplementary table are moved slidingly along said guide rails so as to be fastened at their desired positions and detachably mounted thereon.

According to another aspect of this invention, there is provided a table saw having a circular saw table for supporting a circular saw for cutting a work, a miter table disposed adjacent to said circular saw table and having a miter fence thereon for guiding said work to said circular saw and a supplementary table cooperating with said two tables for supporting said work, said three tables being disposed so as to form a working table, wherein a pair of guide rails are disposed laterally on the front and rear sides of said working table, respectively, a lip fence being bridged between the front and rear guide rails in order to determine a cutting length of said work, said miter fence comprising a main body and a front and a rear guide portions, respectively, provided at the front and the rear ends of said main body, said front guide portion being provided with a movable means for moving laterally slidably said lip fence along said guide rails and a fastening means for fastening said lip fence on said guide rails, said movable means being provided with a movable member which is moved along a groove formed in said front guide rail while its movement in said front and rear direction is restricted.

According to still another aspect of this invention, there is provided a table saw having a circular saw table for supporting a circular saw for cutting a work, a miter table disposed adjacent to said circular saw table and having a lip fence thereon for guiding said work to said circular saw and a supplementary table cooperating with said two tables for supporting said work said three tables being disposed so as to form a working table, wherein a pair of guide rails are disposed laterally on the front and rear sides of said working table, respectively, a lip fence being provided in the front and rear direction of said working table in order to determine a cutting length of said work, said miter fence comprising a main body and a front and a rear guide portions respectively provided at the front and the rear ends of said main body, said front guide portion being provided with a movable means for moving raterally slidably said lip fence along said guide rails and a fastening means for fastening said lip fence on said guide rails, said fastening means has a fastening handle which is so operated that, at a first stage, said front guide portion is pressed to be held on said front guide rail and that, at a second stage, said front guide portion is steadily fastened on said front guide rail and, at the same time, said rear guide portion is fastened on said rear guide rail through a connecting member accommodated in said main body of said lip fence for transmitting movement of said handle to said rear guide portion.

Further objects, features and others of this invention will be understood from the following detailed description of the preferred embodiments of this invention with reference to the drawings.

BRIEF DESCRIPTION OF THE DRAWINGS

In the accompanying drawings:

FIG. 3B shows an elevational view, partially broken away, of the circular saw unit in FIG. 3A;

FIG. 35 shows a longitudinally sectional view of a lip fence;

FIG. 50 shows a laterally sectional view of a first basic front guide rail;

FIG. 51 shows a laterally sectional view of a basic rear guide rail;

FIG. 52 shows a laterally sectional view of a second basic rear guide rail;

FIG. 53 shows a laterally sectional view of a second basic rear guide rail;

FIG. 54 shows a laterally sectional view of an improved front guide rail;

FIG. 55 shows a laterally sectional view of an improved rear guide rail;

FIG. 60 shows a perspective view of the table saw according to this invention.

DETAILED DESCRIPTION OF THE INVENTION

Figure 1:
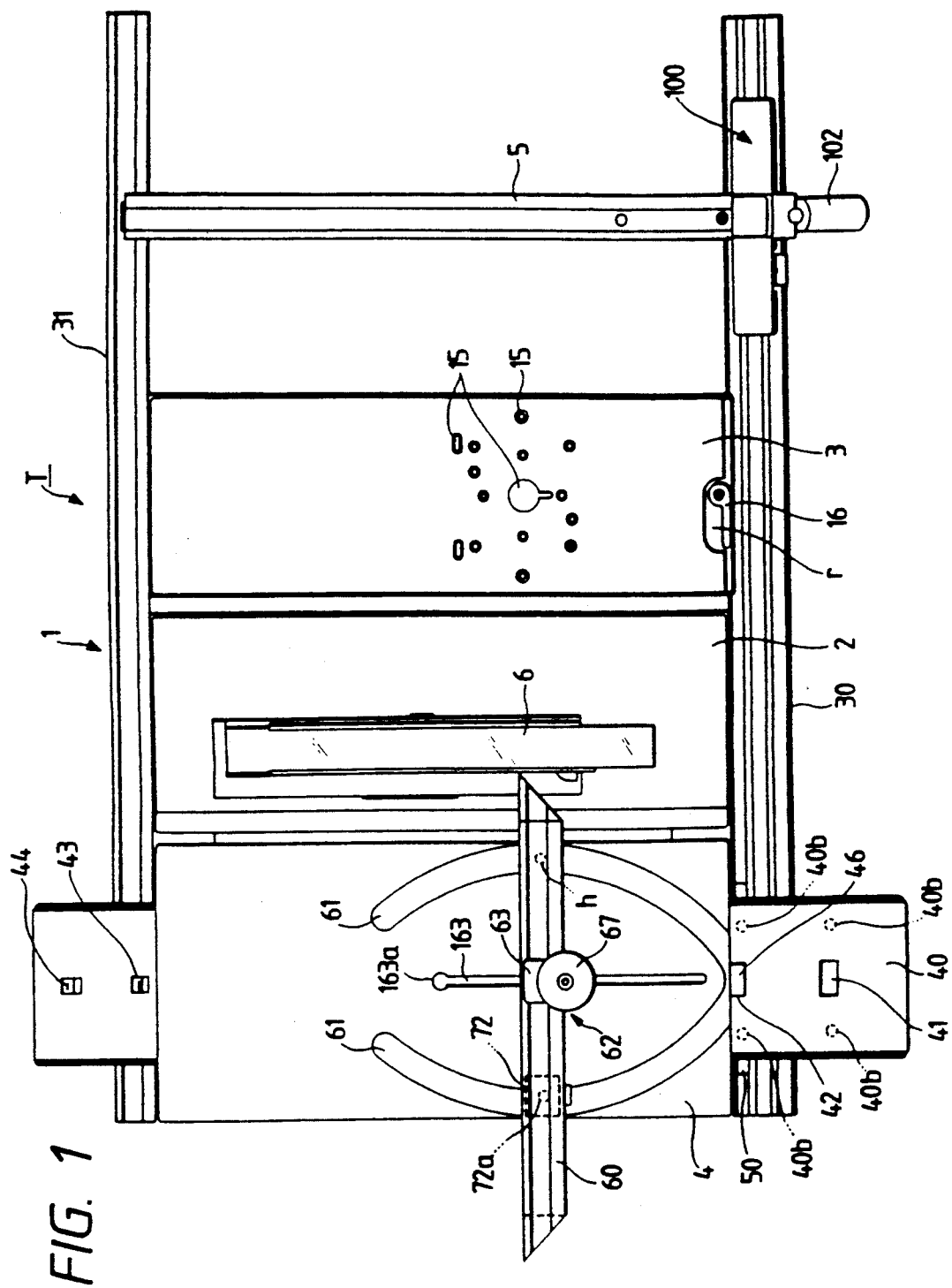
FIG. 1 shows a plan view of a table saw according to this invention.

In FIGS. 1 to 3 and 60, a table saw T according to this invention has a working table 1 which is supported on a frame 7. The working table 1 has a front and a rear guide rails 30, 31 on its front and rear sides thereof as viewed from an operator, respectively. Between these front and rear guide rails 30, 31 is provided a circular saw table 2 having a cover 6 for accommodating a circular saw S. On the right side of the circular saw table 2 as viewed in FIG. 1 is laterally slidably mounted, along the guide rails 30, 31, a supplementary table 3 for supporting a work during working on which a plurality of holes 15, 15 . . . are formed to mount various motor drive tools thereon such as a router, a jig saw, etc. Further, on the right side of the supplementary table 3 as viewed in FIG. 1 is slidably laterally provided, along the front and rear guide rails, a lip fence 5 for determining a cutting dimension of a work. A miter table 4 is provided on the left side of the circular saw table 2 in order to guide the work to a position where the work is cut.

Figure 2:
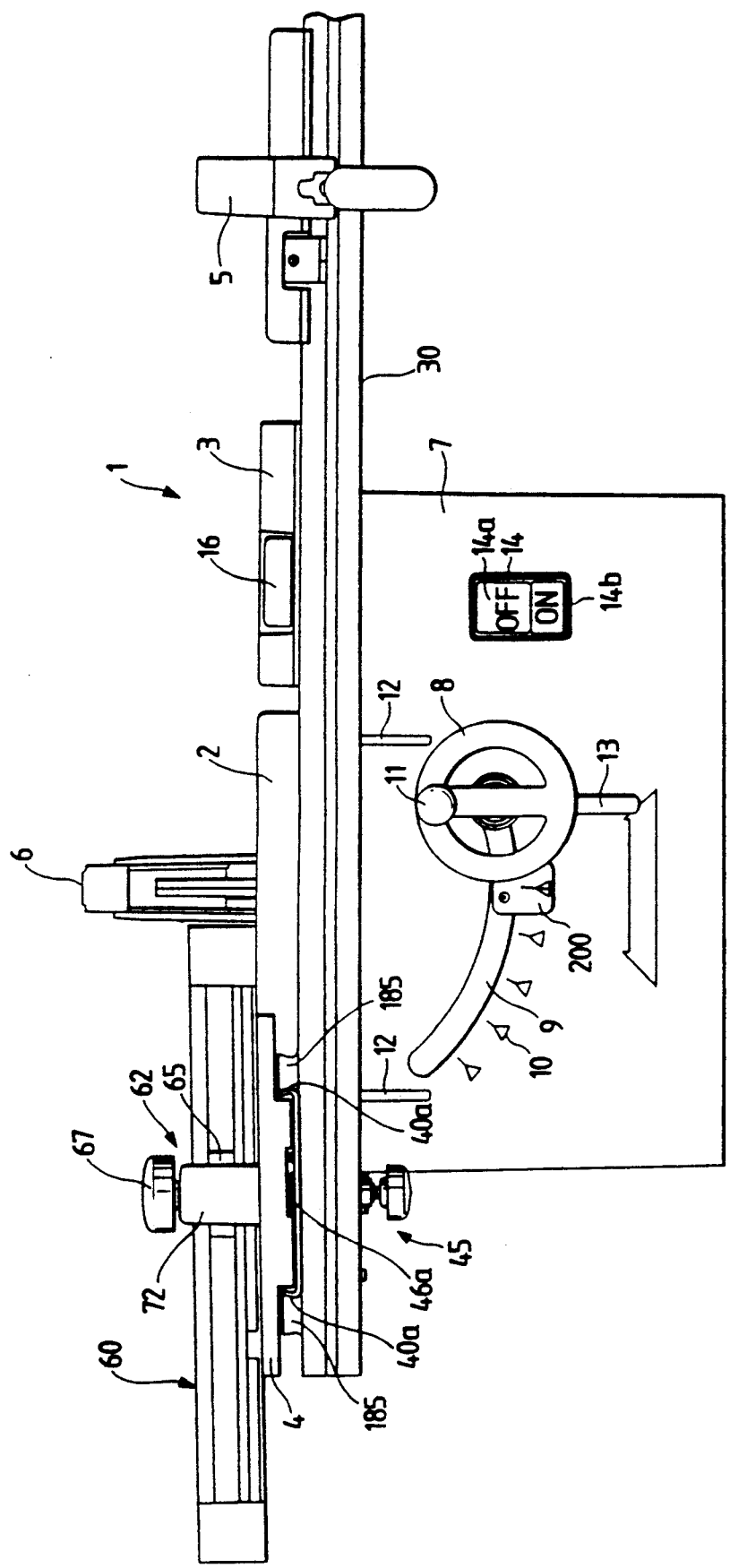
FIG. 2 shows a front elevational view of the table saw in FIG. 1.
Figure 3A:
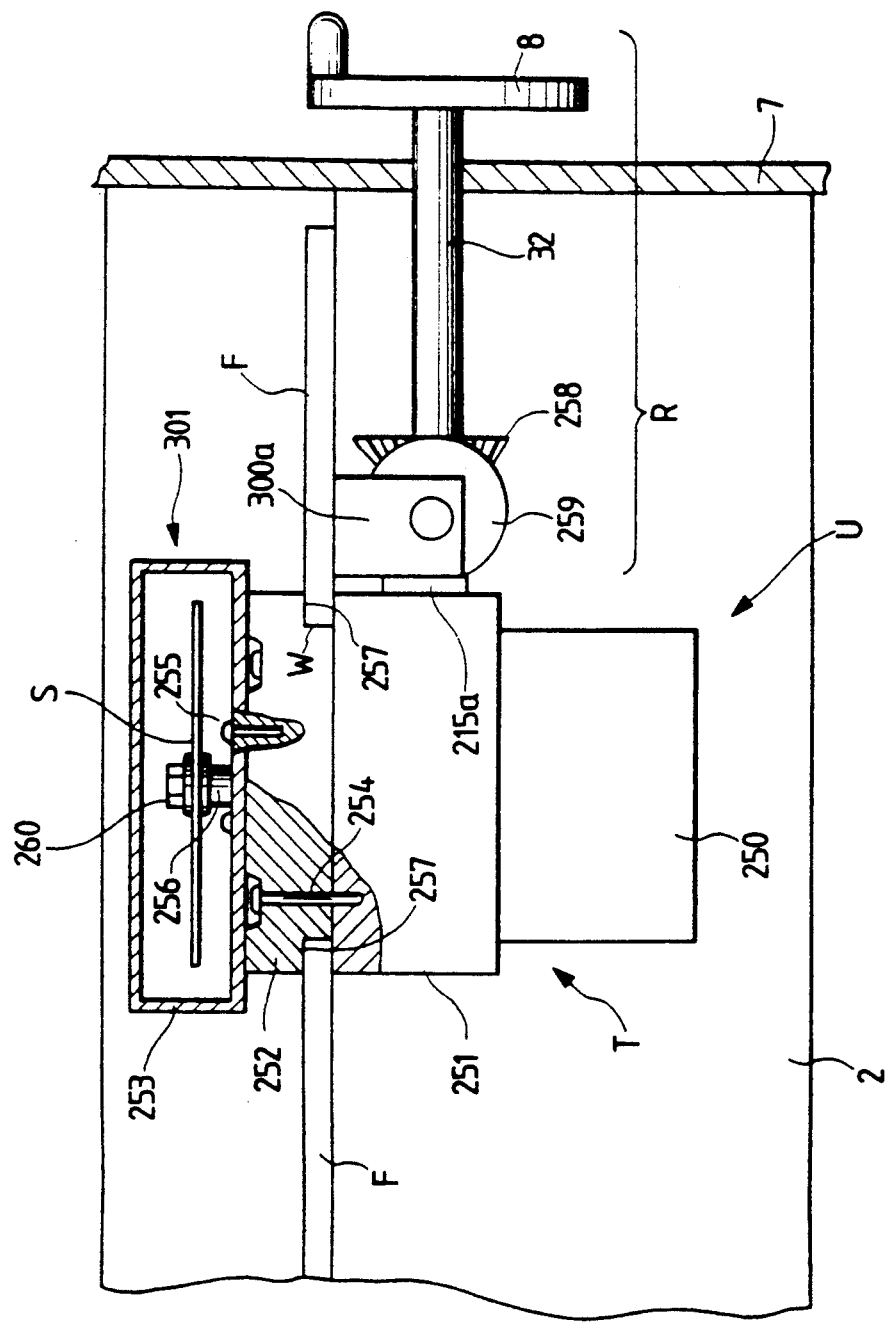
FIG. 3A shows a bottom view, partially broken away, of a circular saw unit.

As shown in FIG. 2, a circular handle 8 is rotatably provided on the front side as viewed from an operator. The circular saw table 2 has a circular saw unit U (FIG. 3A) for holding a circular saw S, a holding section F for holding the circular saw unit U, and a circular saw driving section R for moving the circular saw unit U along the holding section F.

Moreover, the circular saw unit U comprises a cutting portion 301 for cutting the work, and a circular saw driving portion T for driving the circular saw S. The circular saw driving portion T comprises an intermediate holder 251, a motor 250 supported by the intermediate holder 251 and a guide holder 252 provided between the cutting portion 301 and the holder 251. The two holders 251, 252 are connected by a few of screws 254. The cutting portion 301 has a cover 253 which is fixed to the guide holder 252 via a few of screws 255, and the circular saw S is fixed to the end portion of an axis 256 via a screw 260. The holding section F is a plate having a window W for supporting the circular saw unit U, and two recesses 257, 257 provided between the two holders 251, 252 are slidably engaged with the opposite end walls of the window W. The circular saw driving section R is a device for moving vertically the circular saw unit U along the window W of the holding section F, and comprises, as shown in FIG. 3B, a handle 8, a shaft 32 extended from the center portion of the handle 8, a first gear 258 provided at the end of the shaft 32, and a second gear 259 for meshing with the first gear 258, which is held by a screw shaft 390 supported by a holding member 300a.

Figure 4:
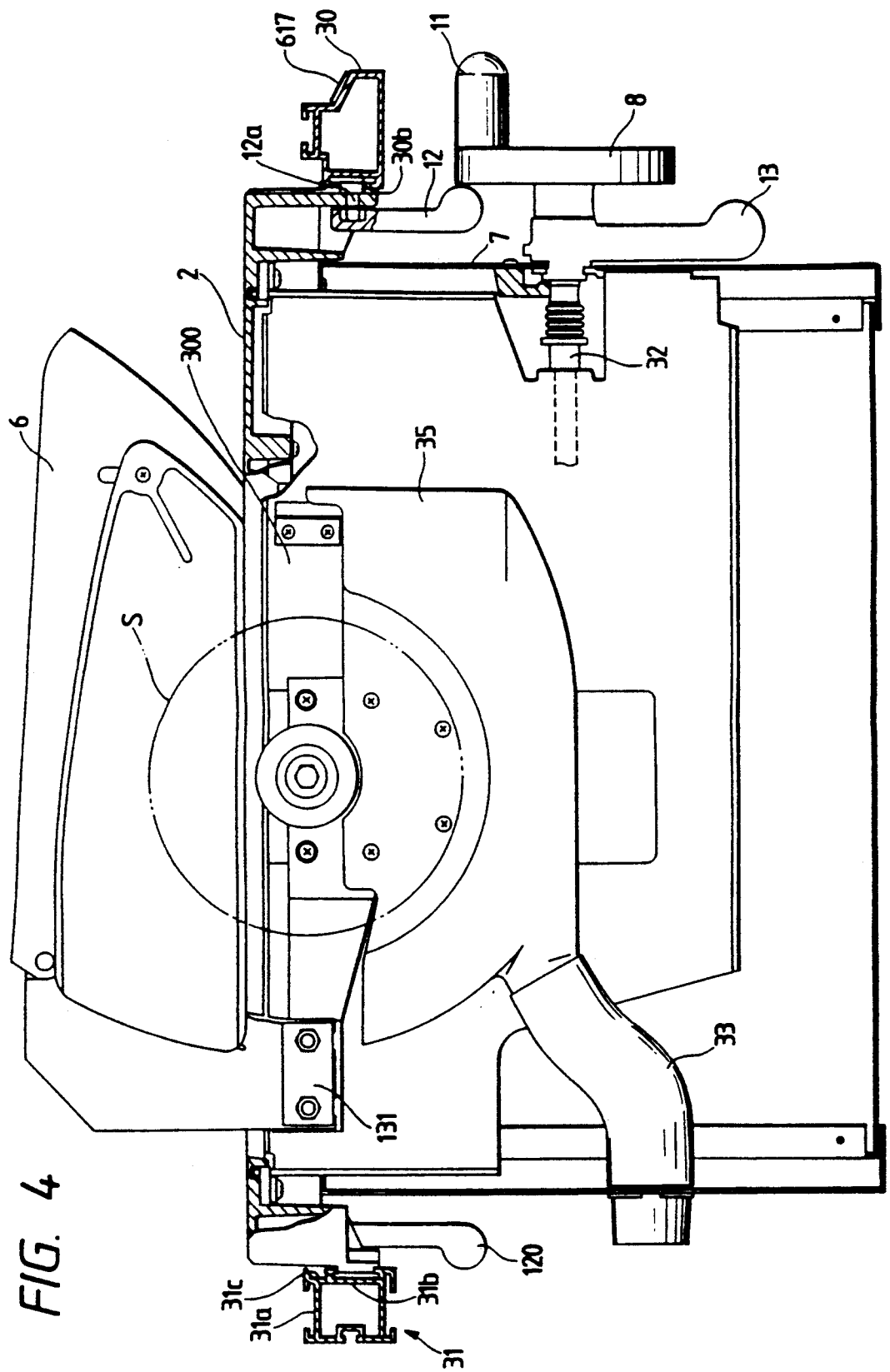
FIG. 4 shows an elevational view of the circular saw unit.

The screw shaft 390 has a screw portion 390a which is engaged with the female screw portion 251a projected from the peripheral surface of the holder 251. When the handle is rotated, the circular saw unit U is moved vertically thereby to project the circular saw S over the circular saw table 2 and to retract it from the table 2 into a guard 35 (FIG. 4). A hose 33 is connected to the guard 35 to discharge chips of the work to be cut by the circular saw S.

As shown in FIGS. 2, 3B and 4, on the back side of the circular handle 8 is provided a fastening lever 13 which fastens and releases the shaft 32 onto and from the supporting frame 7. When the circular handle 8 is rotated with the lever 13 being loosened, the shaft 32 is moved along an arc slit 9 via a well known mechanism, thereby to incline the circular saw S through a desired angle. A dial 10 is formed along the arc slit 9 to indicate the inclining angle of the circular saw. An indicator 200 is projected from the holding section 300 to the front side of the supporting frame 7.

On the right side of the circular handle 8 as viewed in FIG. 2 is provided a switch portion 14 comprising an "off" switch 14a and an "on" switch 14b.

The front guide rail 30 is fastened by a plurality of rail fastening handles 12, 12 . . . 12 provided on the upper portion of the frame 7 at a predetermined space, and the rear guide rail 31 is fastened by a rail fastening handle 120 (FIG. 4). The rail fastening handle 120 has an engaging block 12a at its upper portion whose front end is engaged with the side groove (longitudinal groove) 30b of the front guide rail 30 thereby to enable the front guide rail 30 to move laterally with respect to the supporting frame 7. After the front guide rail 30 is moved slidingly laterally in a state wherein the rail fastening handle 12 is loosened, the rail fastening handle 12 is rotated downwardly as shown in FIG. 4, and thus the front guide rail 30 is fastened onto the frame 7. Moreover, the rear guide rail 31 can be also moved slidably laterally through the operation of the fastening handle 120.

Figure 5:
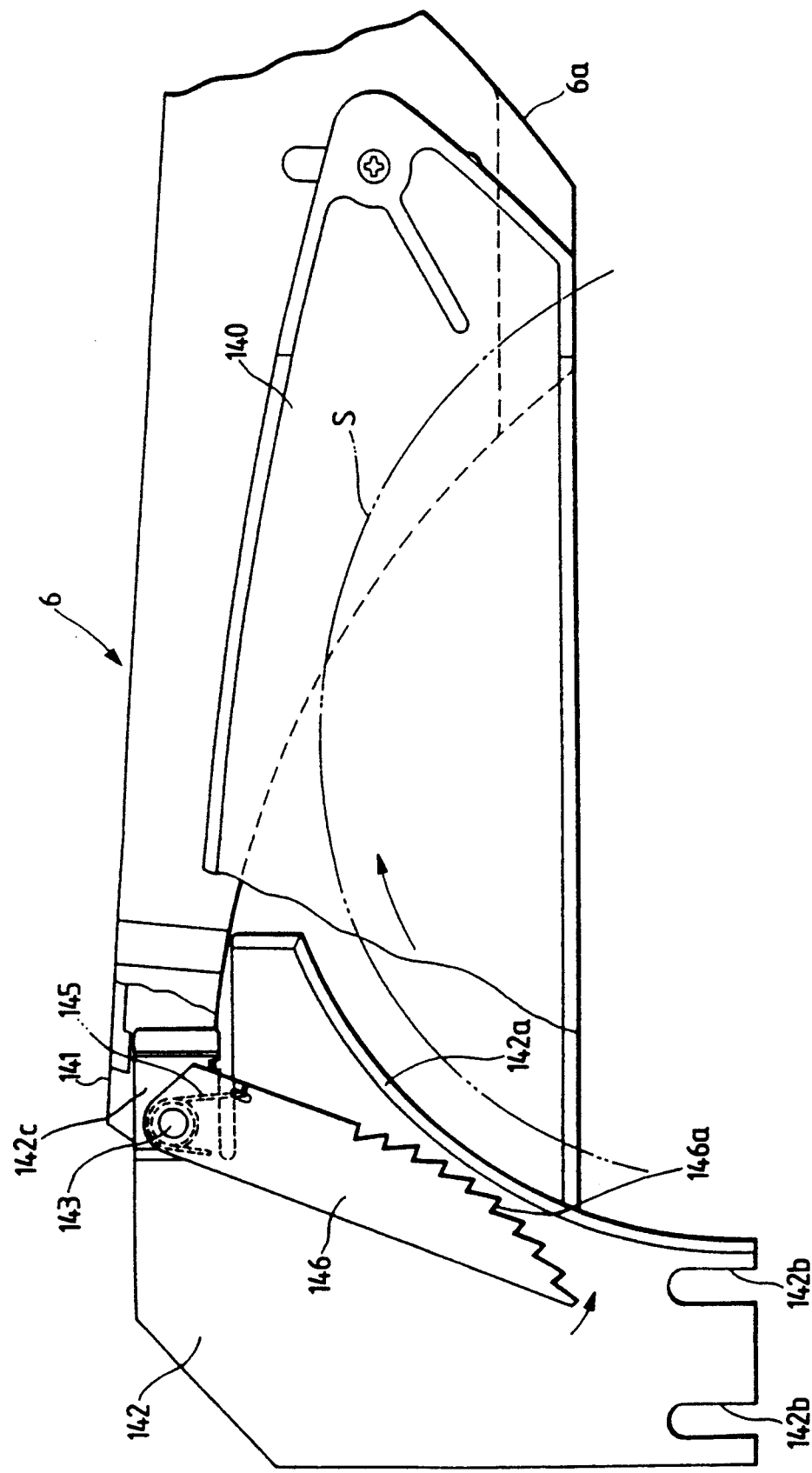
FIG. 5 is a side elevational view of a cover for a circular saw.
Figure 6:
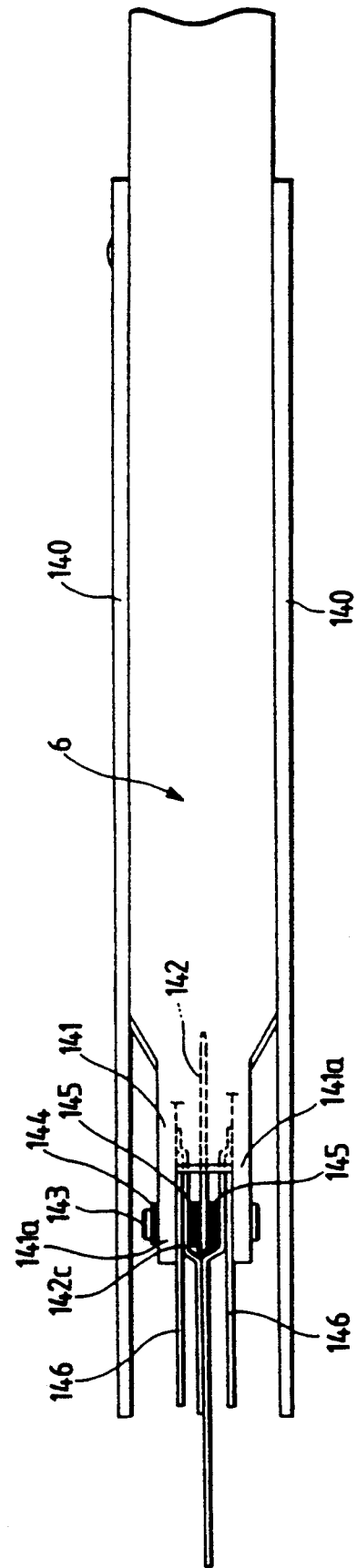
FIG. 6 is a plan view of the cover for the circular saw.

The safe cover 6 has, as shown in FIGS. 5 and 6, a pair of side plates 140, 140, and an attaching portion 141 on the left side as viewed in FIGS. 5 and 6, which is supported rotatably by a supporting portion 142c of a splitter 142 for preventing the work having just been splitted by the saw S from fastening the side faces of the saw S due to deformation or distortion during working. On the opposite sides of the splitter 142 are provided two repulsive prevention members 146, 146 for preventing the work having been cut from jumping upwardly.

The splitter 142 has an arched edge 142a which is inserted into an opening formed between two pieces of the work cut by the circular saw S thereby to prevent the two pieces from coming close to each other, and resultantly fastening the saw S. At the lower part of the splitter 142 are formed two recesses 142b, 142b which engages with a part of the supplementary frame 131 in a manner that its engaging portion is adjusted vertically as shown in FIG. 5. The supporting portion 142c of the splitter 142 is Y-shaped and inserted into the two arms 141a, 141a formed at the attaching portion 141 of the safe cover 6 so as to be assembled together with the two arms 141a, 141a via a pin 143. The pin 143 is held in position by a stopper pin 144 and supports pivotably the upper portion of each of the repulsive prevention members 146 whose lower part has the teeth 146a. Each repulsive prevention member 146 is urged by a coil spring 145 in the counterclockwise direction as viewed in FIG. 5. The safe cover 6 has, at its right end, an inclined surface 6a against which the work to be cut abuts when it is supplied toward the saw S, and the safe cover 6 is swung upward gradually as the work is fed forward.

Figure 7:
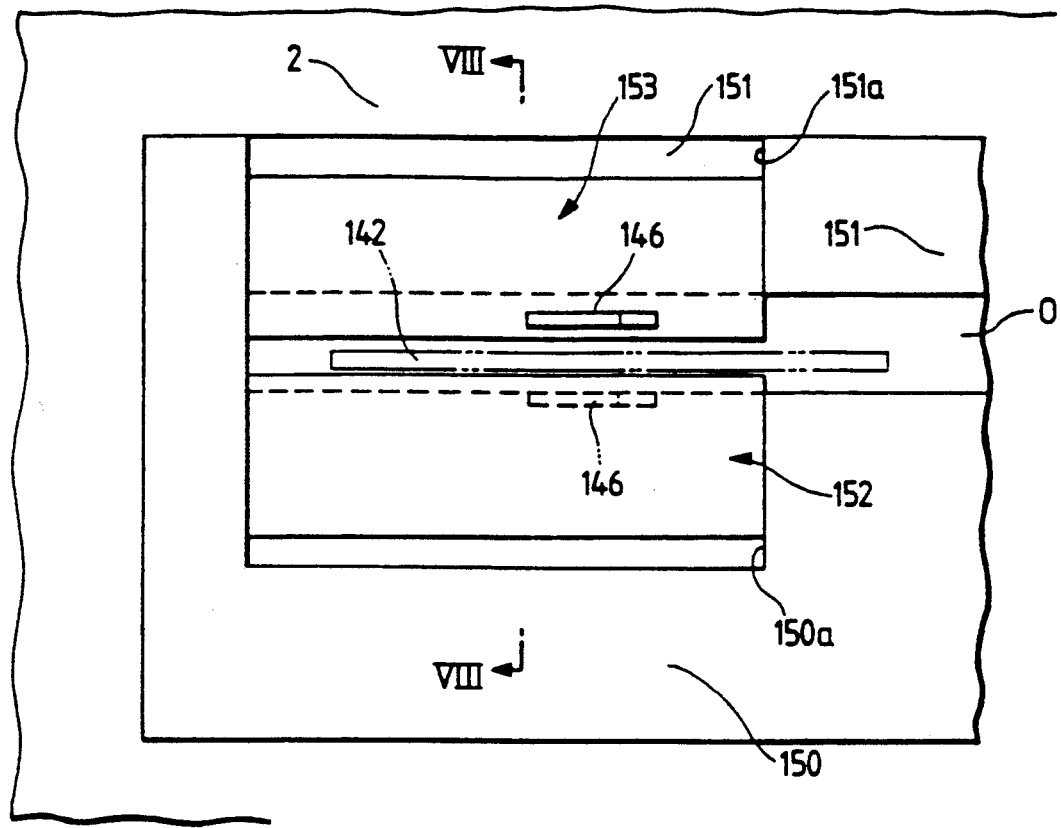
FIG. 7 is a plan view of two cutting edge plates defining an opening through which the circular saw is projected or retracted.
Figure 8:
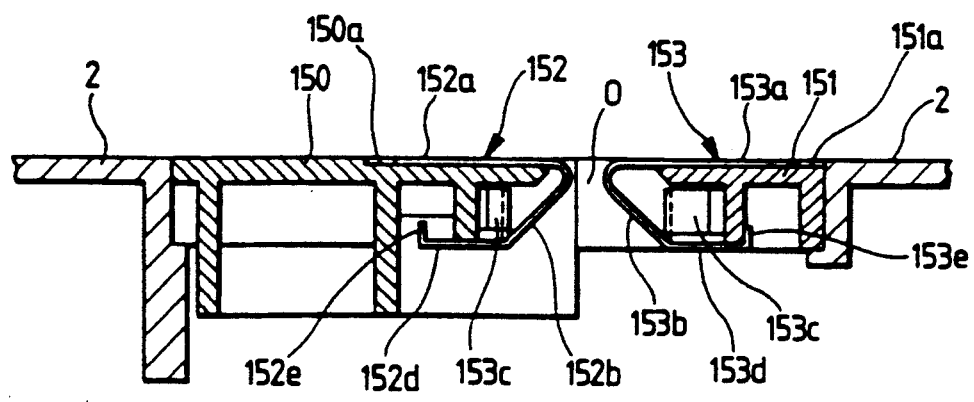
FIG. 8 shows a sectional view taken along the line VIII—VIII.
Figure 9:
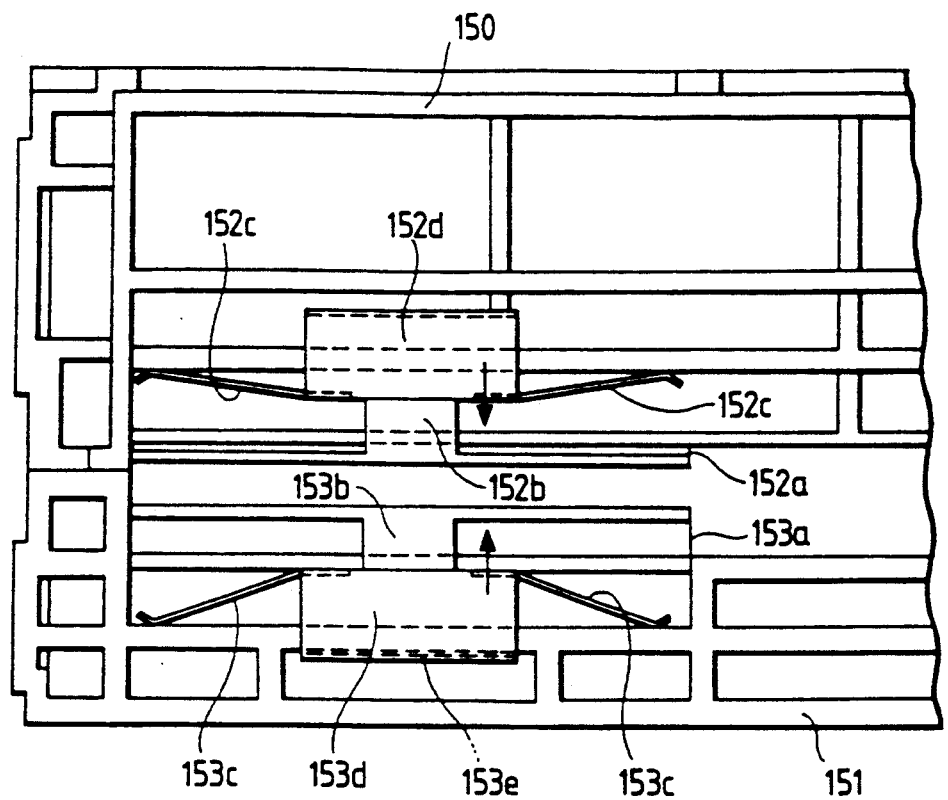
FIG. 9 shows a back view of the cutting edge plates.

On the rear side of the circular saw table 2 are provided a first and a second cutting edge plates 150, 151 opposed to each other to form a cutting portion between which an opening O is formed so that the circular saw S is projected therethrough. These cutting edge plates 150, 151 are made of resin. In this manner, as the opening O is defined by resin cutting edge plates 150, 151, if the circular saw S happens to abut against either edge of the cutting edge plates 150 or 151 when an external force is exerted on the saw S during working or when the circular saw S is used in an inclined manner, neither a large noise nor a spark nor chips occur. Accordingly, a safe working can be performed. On the respective surfaces of the cutting edge plates 150, 151 are provided two shallow recesses 150a, 151a in which two guard plates 152, 153 made of steel are set opposedly to each other in a state wherein the guard plates 152, 153 are urged to be moved close to each other. These guard plates 152, 153 comprises, as shown in FIGS. 7 to 9, two upper horizontal portions 152a, 153a moved slidingly in the shallow recesses 150a, 151a, two connecting portions 152b, 153b extended obliquely outwardly from their inner ends, two lower horizontal portions 152d, 153d extended horizontally from the lower ends of the connecting portions 152b, 153b, two engaging projections 152e, 153e projected from these lower horizontal portions 152d, 153, and two urging plate portions 152c, 153c formed so as to be cut outward from the both end portions of the connecting portions 152b, 153b. The urging plate portions 152c, 153c are projected toward the opposite sides of the connecting portions 152b, 153b, and their distal end portions abut against the walls of the cutting edge plates 150, 151, respectively, to thereby urge the two guard plates 152, 153 toward inside thereof so as to close the opening O.

The lower portions of the repulsive prevention members 146, 146 abut against the upper horizontal portions 152a, 153a of the two cutting edge plates 150, 151, respectively, and, however, the two guard plates 152, 153 do not get injured because they are made of steel and the repulsive prevention members 146 are made of resin. Further, since the two guard plates 150, 151 are urged toward the direction to close the opening O, when the circular saw S is inclined together with the splitter 142 so that the splitter 142 moves one of the guard plates 150, 151 toward one side of the opening O, the other of the guard plates 150, 151 is moved close to the opposite guard plate so as to close the opening O thereby to effectively prevent the lower end of each repulsive prevention member 146 from dropping into the opening O.

Figure 10:
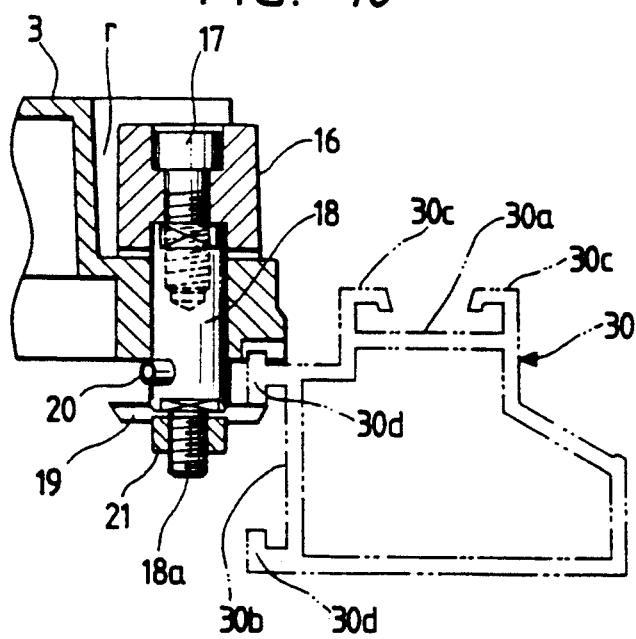
FIG. 10 shows a state wherein a supplementary table is supported by a front guide rail.
Figure 11:
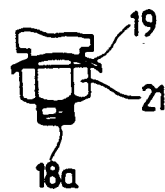
FIG. 11 shows a state of the lower portion of a fastening bolt for fastening the supplementary table onto the front guide rail.
Figure 12:
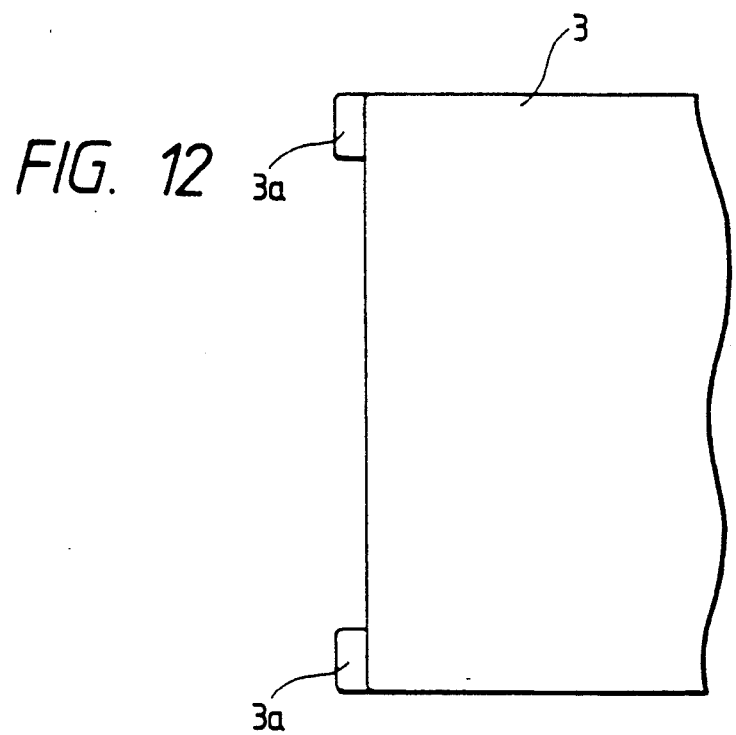
FIG. 12 shows a plan view of the rear portion of the supplementary table.
Figure 13:
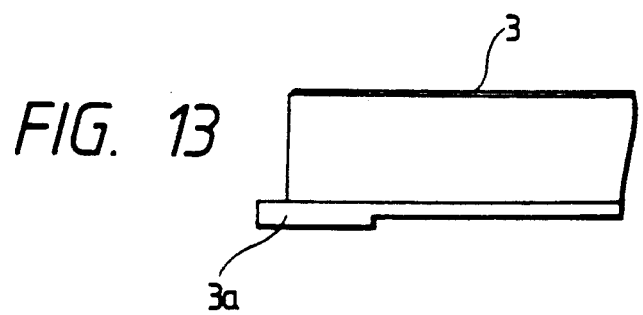
FIG. 13 shows a side elevational view of the rear portion of the supplementary portion.

The supplementary table 3 has, at its end on the side of the front guide rail 30, a recess r (FIGS. 1 and 10) in which a lever 16 is provided, and, at the lateral opposite ends of the supplementary table 3 on the side of the rear guide rail 31, a pair of engaging projections 3a, 3a (FIGS. 12 and 13) which slidably engages with an upper lateral groove 31c of the rear guide rail 31 as shown in FIG. 4. The lever 16 is, as shown in FIG. 10, connected to an rotary shaft 18 by a fastening bolt 17, whose lower portion has a screw portion 18a which engages with a nut 21 to support a curved leaf spring plate 19 at the lower portion of the rotary shaft 18. The leaf spring plate 19 abuts against the lower surface of the side projection 30d of the front guide rail 30 when the rotary shaft 18 is rotated thereby to fix the supplementary table 3 onto the front guide rail 30. Rotary shaft 18 has, at its lower portion, a rotation restricting projection 20 to restrict the rotation of the rotary shaft 18 in such a manner that when the rotary shaft 18 is rotated at a predetermined angle, the projection 20 engages with the side projection 30d of the front guide rail 30 thereby to prevent an excessive rotation of the rotary shaft 18. FIG. 10 shows a state where the supplementary table 3 is fixed to the front guide rail 30, and when the lever 16 is rotated from this state to release the leaf spring 19 from the lower surface of the side projection 30d, the supplementary table 3 can be slid laterally along each of guide rails 30, 31. If the supplementary table 3 is raised inclinedly, the supplementary table 3 can be released from the front and rear guide rails 30, 31 and can be set on the guide rails 30, 31 at any position with respect to the circular saw table 2.

Figure 14:
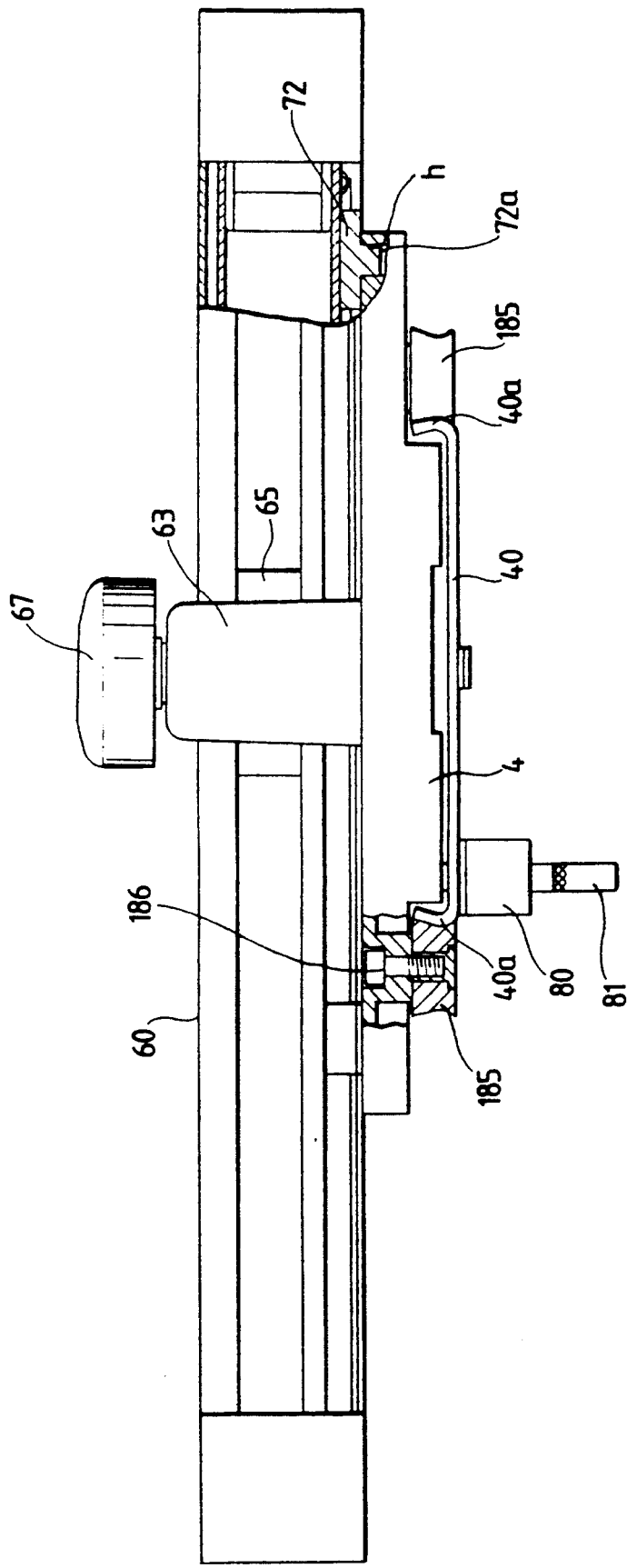
FIG. 14 shows a side elevational view of a miter table with a partial sectional view.
Figure 15:
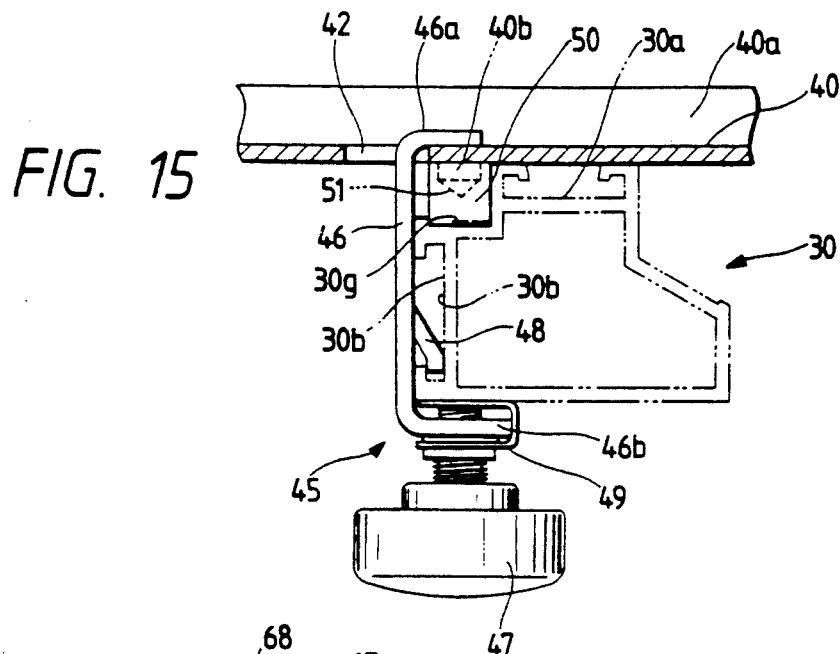
FIG. 15 shows a state of engagement of a guide plate for supporting the miter table with the front guide rail.

The miter table 4 is supported on a guide plate 40 which is disposed perpendicularly to the front and rear guide rails 30, 31 and which has a length longer than the distance between the two guide rails 30, 31. As shown in FIGS. 2 and 14, the guide plate 40 has, at its lateral ends, two curled raised portions 40a, 40a which engage with a plurality of rollers 185, 185 ... 185 disposed separately in the longitudinal direction of the miter table 4, and each roller 185 is supported by a pin 186. There may be two pairs of rollers 185 disposed separately in the front and rear direction of the miter table on its lateral opposite sides, and the miter table 4 can be slid in the front and rear direction. On the side of the front guide rail 30 of the guide plate 40 are provided two openings 41, 42 disposed separately for fastening the guide plate 40 onto the front guide rails 30 together with a guide plate fastening member 45 as shown in FIG. 15. The member 45 comprises a fastening plate 46 disposed vertically whose upper portion forms a horizontal portion 46a which passes through the opening 42 to abut against the upper surface of the guide plate 40. The vertical portion of the fastening plate 46 has, on its inner surface, an engaging projection 48 which is inserted into a side groove 30b of the front guide rail 30. The fastening plate 46 has, at its lower portion, a lower horizontal portion 46b which holds the screw portion of a rotary knob 47 whose upper end abuts against the lower surface of the front guide rail 30 via an intermediate member 49. The rotation of the rotary knob 47 makes the upper horizontal portion 46a abut against the upper surface of the guide plate 40 and separate therefrom.

Figure 16:
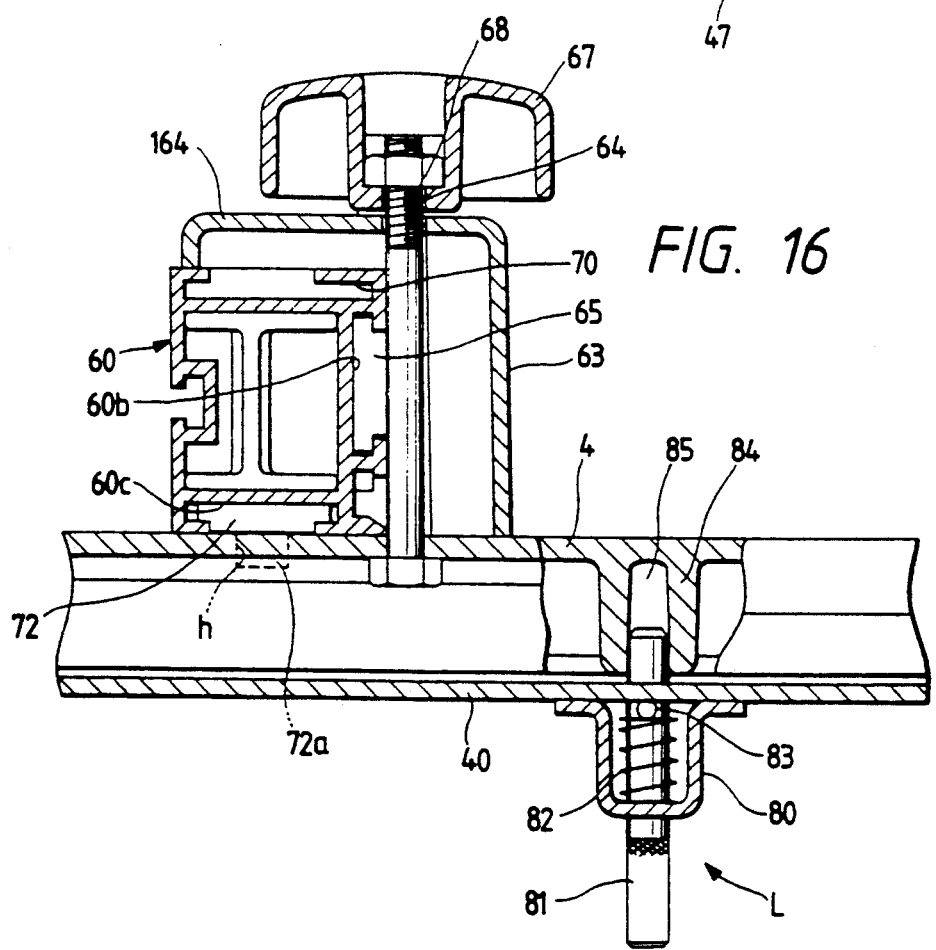
FIG. 16 shows a longitudinally sectional view of the miter table.
Figure 17:
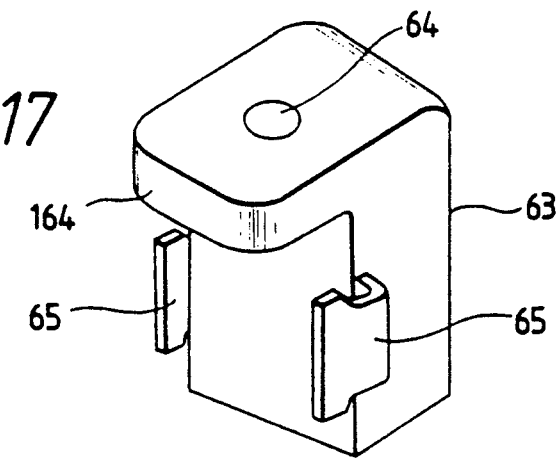
FIG. 17 shows a perspective view of a holder for holding a miter fence.

A slide bar 50 is engaged with a groove 30g of the front guide rail 30 near the opening 42 of the guide plate 40 and has a hole 51 into which a projection 40b formed on the lower surface of the guide plate 40 is inserted whereby the guide plate 40 is supported slidably by the front guide rail 30 through the slide bar 50. That is, the slide bar 50 can be slid laterally along the front guide rail 30 by loosening the guide plate fastening member 45. The guide plate 40 can be removed from the front guide rail 30 by releasing the fastening plate 46 from the opening 42 thereby to enable the guide plate 40 to be fixed to the front guide rail 30 via another opening 41 for cooperating with the fastening member 45. In this manner, if a plurality of openings 40, 41 are formed in the guide plate 40, the guide plate 40 can be fixed at several different positions. In addition, the miter table 4 can be released from the two guide rails 30, 31. On the side of the rear guide rail 31 on the guide plate 40 are disposed, at a certain space, two fastening projections 43, 44, and the distance between the two fastening projections 43, 44 corresponds to the distance between the two openings 41, 42. The two fastening projections 43, 44 are extended downwardly in a tongue form, respectively, and engage with an upper groove 31a of the rear guide rail 31 as shown in FIG. 1. The guide plate 40 is fixed to the two guide rails 30, 31 by the guide plate fastening member 45 cooperating with the opening 41 or 42 and the fastening projection 43 or 44. The miter table 4 has, on its upper surface, a pair of arched dial plates 61, 61 disposed opposite to each other, and, at the center position between the opposed dial plates 61, a slit 163 whose one end has an enlarged portion 163a. A miter fence 60 is provided on the miter table 4 by a miter fence clampling device 62. The device 62 has, as shown in FIGS. 16 and 17, a holder 63 having a pair of side holding arms 65, 65 at its lateral ends for slidably engaging with a side groove 60b of the miter fence 60. The holder 63 is fixed to the miter table 4 by a bolt 68 for holding a rotary knob 67, and can be fixed to or released from the miter table 4 by the rotation of the rotary knob 67. The bolt 68 is passed through an opening 64 formed in a projected portion 164 of the holder 63 to project upwardly, and its projected end is fixed to the rotary knob 67. The miter fence 60 has a lower groove 60c with which a pivot block 72 is engaged, and the pivot block 72 has a pivot axis 72a which is inserted into a hole h formed in the miter table 4 to form a rotary center for the miter fence 60. Another hole h is also formed on the right side of the miter table as viewed in FIG. 1 in order to form a right side pivot center for the miter fence 60 when the miter table 4 is moved on the right side of the circular saw 2 and the pivot axis 72a of the pivot member 72 is inserted into the right hole h.

Figure 18:
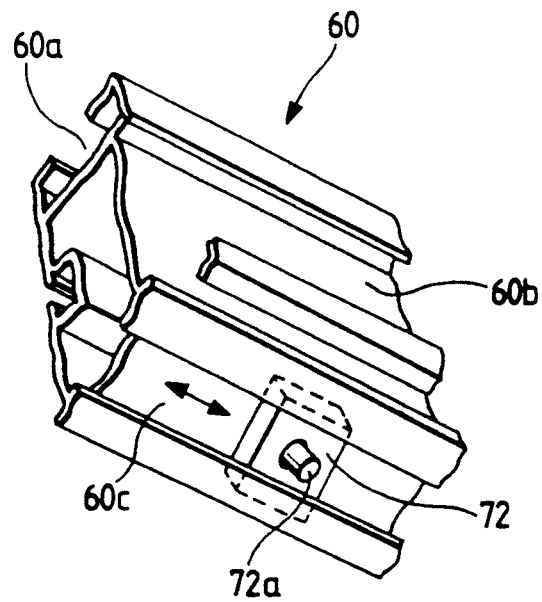
FIG. 18 shows a perspective view of a part of the miter fence.
Figure 19:
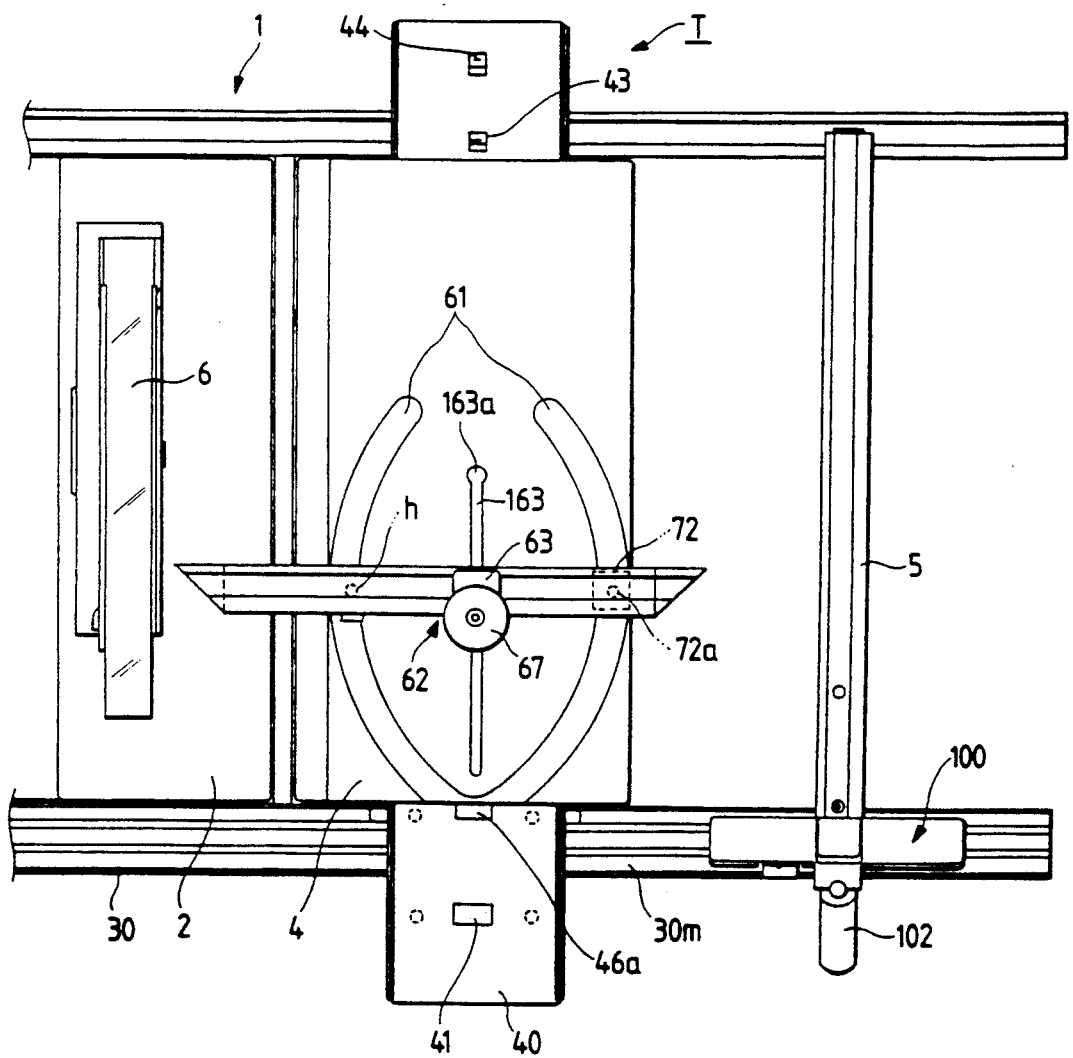
FIG. 19 shows a plan view of a state wherein the miter table is set at a position different from that of FIG. 1.

After the pivot block 72 is moved in the lower groove 60c as shown in FIGS. 18 and 19, the miter fence 60 can be rotated about the pivot axis 72a. If the miter fence 60 is rotated in a state wherein the rotary shaft 67 is loosened, the holder 63 can be moved along the slit 163 in the front and rear direction of the miter table. At this time, the side holder arms 65 are slid in the side groove 60b thereby to enable the miter fence 60 to rotate about the pivot axis 72a irrespective of the linear movement of the holder 63 along the slit 163. If the holder 63 is moved to the enlarged portion 163 of the slit 163 to pull up the rotary knob 67, the bolt 68 can be passed through the enlarged portion 163a to lift up the holder 63 from the miter table 4.

When the miter table 4 is set on the left side of the circular saw table 2 as shown in FIG. 1, the pivot axis 72a is inserted into the left hole h about which the miter fence 60 is rotated thereby to increase a working width for the work. That is, the work can be set at various angles with respect to the saw S. When the miter table 4 is set on the right side of the table 2 as shown in FIG. 19, the miter fence 60 is released from the miter table 4 as mentioned above and the pivot member 72 is moved slidingly in the lower groove 60c to the opposite side of the fence 60 to insert the pivot axis 72a into the right hole h thereby to form a pivot point. In this case, the left distal end of the miter fence 60 comes close to the cutting position of the saw S. The miter fence 60 is located in such a manner that the distal end thereof is set close to the cutting position of the saw S while the miter fence 60 is moved slidingly toward the cutting position in a state of miter fence clamping device 62 being loosened.

If the miter fence 60 is removed from the miter table 4, the miter table 4 can be used as a supplementary table. In addition, since the miter table 4 and the supplementary table 3 can be removed from the two guide rails 30, 31, the working table 1 has a variety in the arrangement of a plurality of table in accordance with various kinds of works to be cut thereby to enhance its applicability.

In FIG. 19, the supplementary table 3 can be set between the miter table 4 and the lip fence 5.

At a certain position on the lower surface of the guide plate 40 is, as shown in FIG. 16, formed a miter table location device L which has a pin receiving member 80 having a cup-like shape for supporting a stopper pin 81 which has a coil spring 82. The upper end portion of the coil spring 82 abuts against a projected pin 83, and the lower end portion thereof abuts against the bottom of the pin receiving member 80. The upper end of the stopper pin 81 projects upwardly over the guide plate 40 to be inserted into a pin hole 85 formed on the inner surface of the miter table 4 whereby the miter table 4 can be fixed to the guide plate 40. If the stopper pin 81 is pulled down, the upper end of the stopper pin 81 is released from the pin hole 85, and, with this state, the miter table 4 can be moved in the front and rear direction of the working table 1 with the guide rollers 85 being rotated along the raised portions 40a of the guide plate 40.

Figure 20:
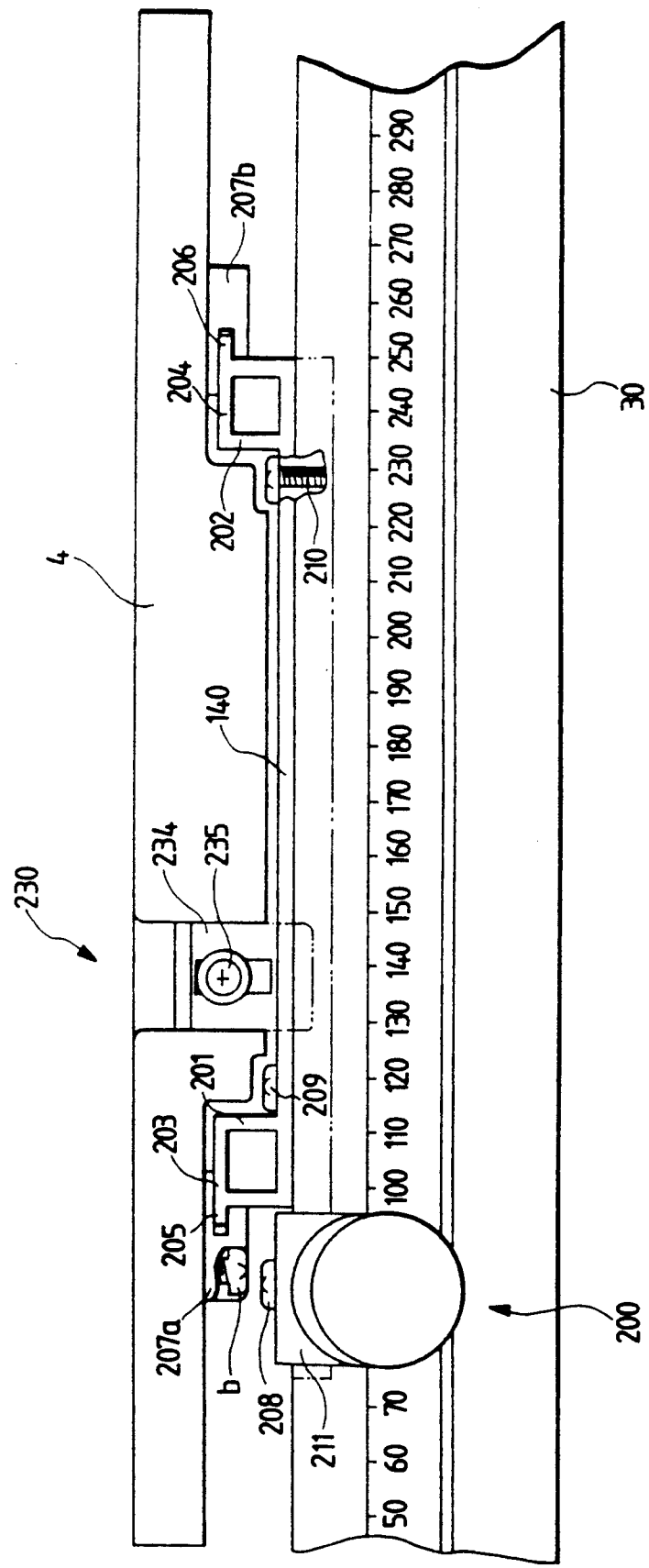
FIG. 20 shows a front view of another embodiment for fastening the miter table onto a guide plate.

FIG. 20 shows another type of guide plate fastening member 45 shown in FIG. 15. A guide plate fastening member 200 fastens a guide plate 140 onto the front guide rail 130. The guide plate 140 has a pair of raised portions 201, 202 having a hollow rectangular space, from the upper face of which two projections 205, 206 are projected horizontally outwardly. The two projections 205, 206 are extended from the front end of the guide plate 140 to the rear end thereof, and the miter table 4 has, at its lower surface, a plurality of engaging members 207a, 207b which are fixed to the miter table 4 by a plurality of screws 6. The engaging members 207a, 207b are provided separately at the front and rear portions of the miter table 4, and the miter table 4 is moved slidingly along the guide plate 140 in the front and rear direction thereof in a state wherein the engaging members 207a, 207b engages with the two projections 205, 206.

Figure 21:
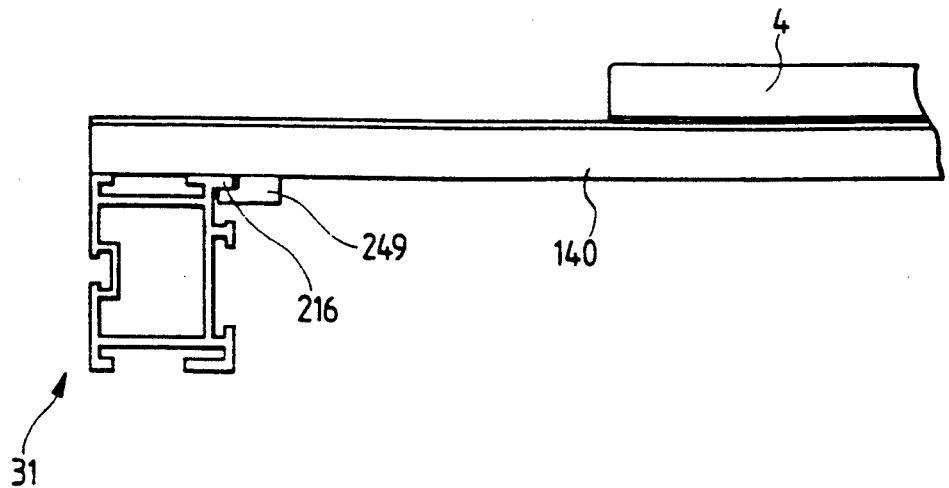
FIG. 21 shows a state of engagement of the guide plate with the rear guide rail.
Figure 22:
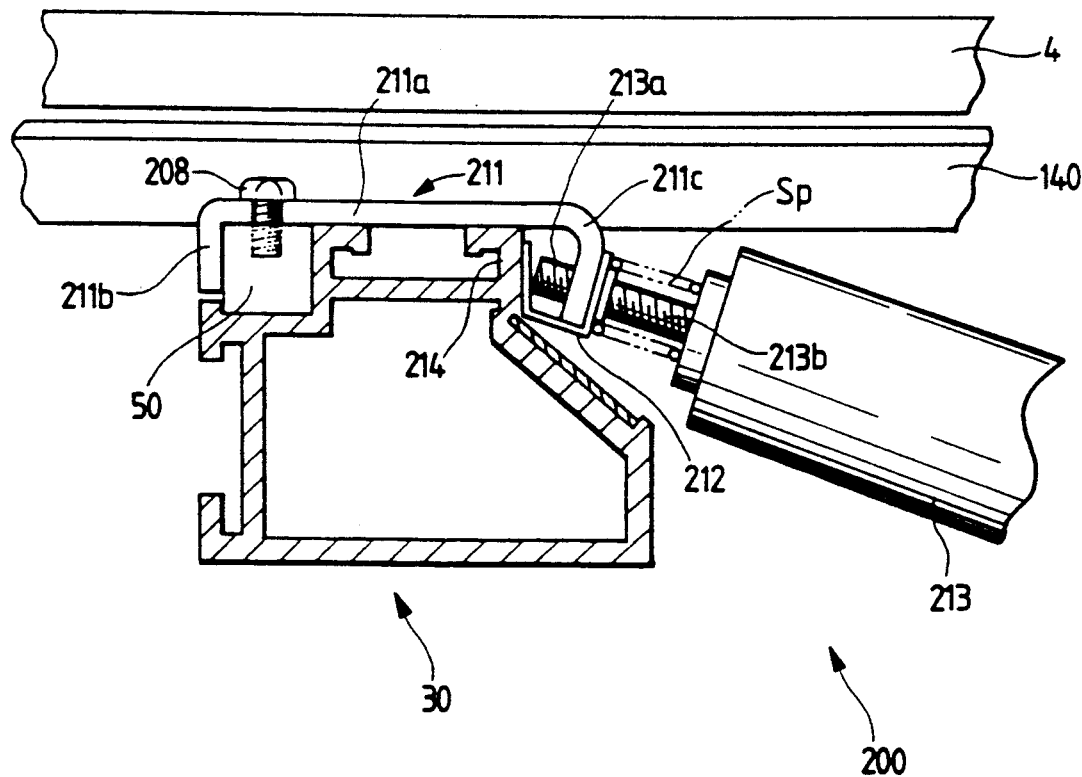
FIG. 22 shows a state of fastening of the guide plates onto the front guide rail.

As shown in FIGS. 19 and 20, the guide plate 140 is fixed to the upper surface of the front and rear guide rails 30, 31 via the slide bar 50 and a plate 211 at its front portion and an engaging member 249 provided at its rear portion. The plate 211 is fixed to the slide bar 50 at its one end portion by a screw 208 and the guide plate 140 is fixed to the slide bar 50 by a plurality of screws 209, 210 (FIGS. 20 and 22). A plate 211 includes a flat portion 211a extending on the front guide rail 30 and two end portions 211b, 211c extended downwardly therefrom. The screw portion 213b of a fastening handle 213 is screw-engaged with the front end 211c of the plate 211, and a spring $S_P$ is provided around the screw portion 213b whose front end 213a abuts against an urging plate 212. The end portion 211b on the opposite side thereof is fixed to the slide bar 50 by the screw 208. The urging plate 212 prevents the front end 213a of the handle 213 from abutting directly against the side surface of the raised portion 214 of the front guide rail 30 thereby to avoid getting injured of the side surface. Further, a fastening ability of the guide plate fastening member 200 is enhanced by an increase of frictional force by the urging plate 212. The rear guide rail 31 has a hollow rectangular shape, as shown in FIG. 21, and a guide projection 216 at its upper end for engaging with the engaging member 249 fixed to the lower surface of the guide plate 140.

Figure 23:
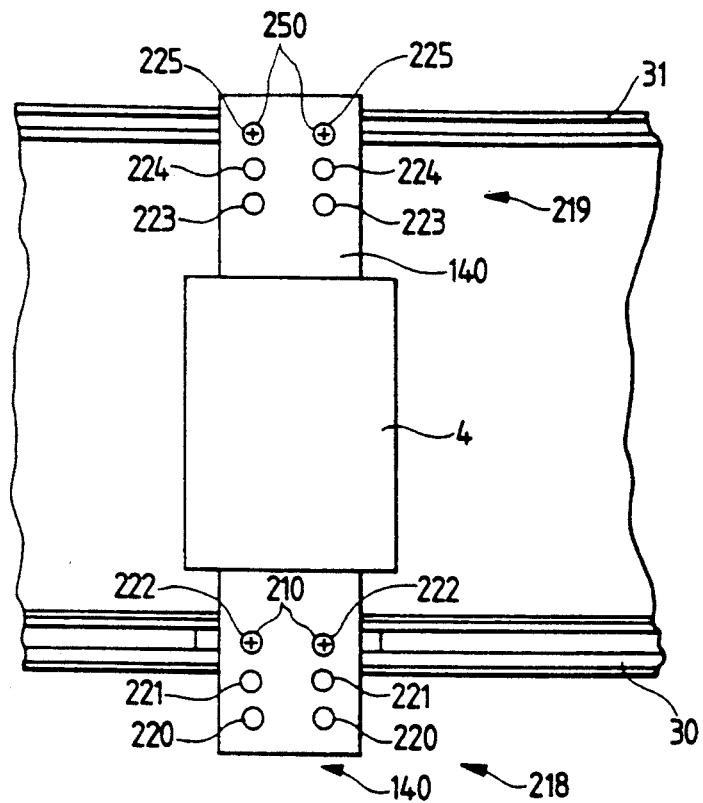
FIGS. 23 and 24 show two plan views of a state of engagement of the guide plate with the front and rear guide rails, respectively.
Figure 24:
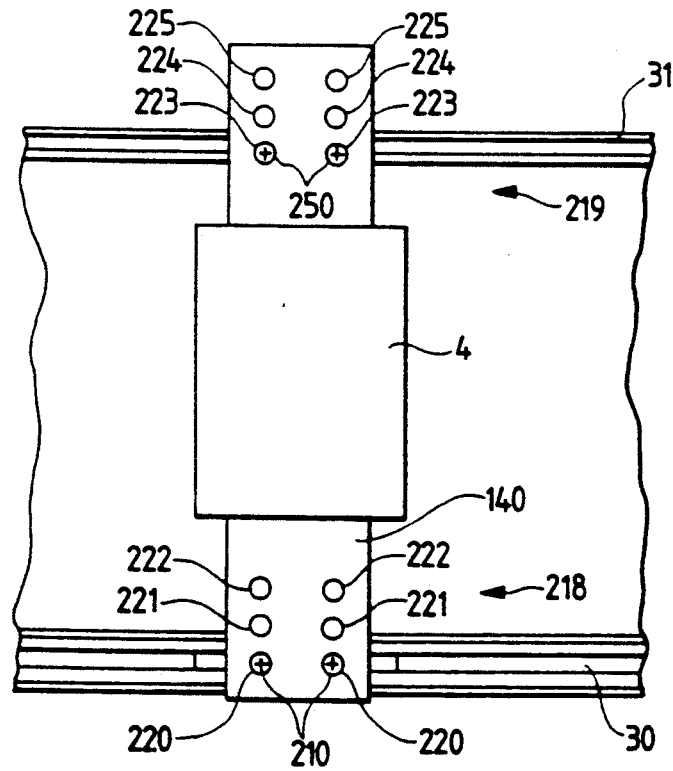

Moreover, as shown in FIGS. 23 and 24, the guide plate 140 may have a plurality of holes 220 to 225 at its front and rear portions. That is, the front portion 218 can be selectably fixed to the slide bar 50 through a plurality of screws 210 cooperating with the holes 220 to 222, and the rear portion 219 can be selectably fixed to the engaging member 249 through a plurality of screws 250 cooperating with the holes 223 to 225. In addition, the holes 220 of the front portion 218 corresponds to the holes 223 of the rear portion while the holes 222 corresponds to the holes 225. In this manner, the guide plate 140 can be selectably fixed to the guide rails 30, 31 at a desired position. If it is desired to mount the guide plate 140 on the right side of the circular saw table 2, the guide plate 140 is moved while the slide bar 50 is moved there and the engaging member 249 is slid on the guide projection 216.

Figure 25:
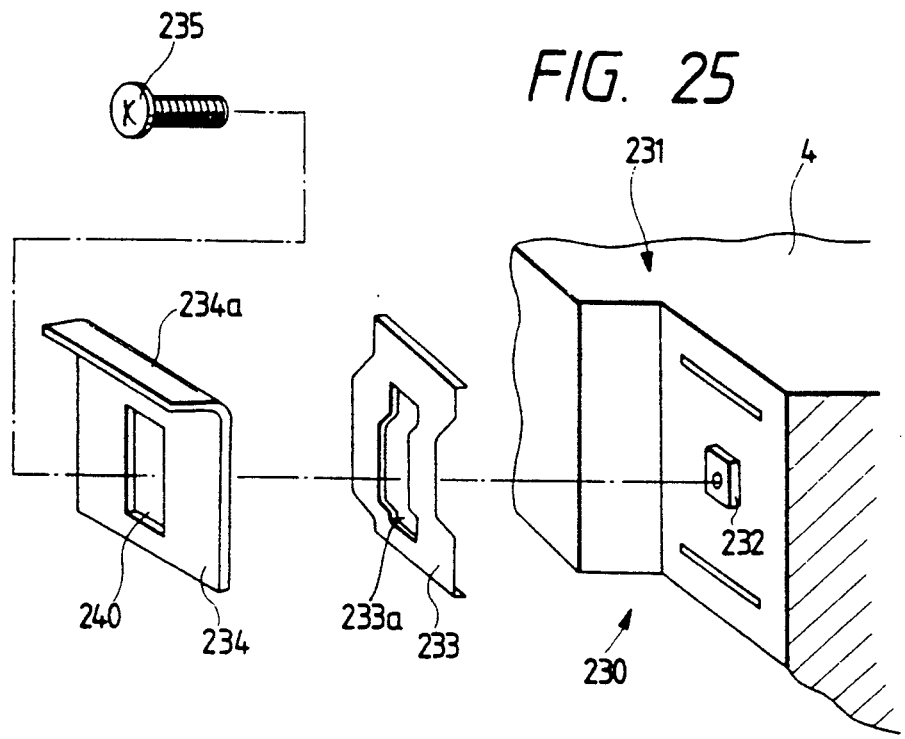
FIG. 25 shows an exploded perspective view of a miter table location device.
Figure 26:
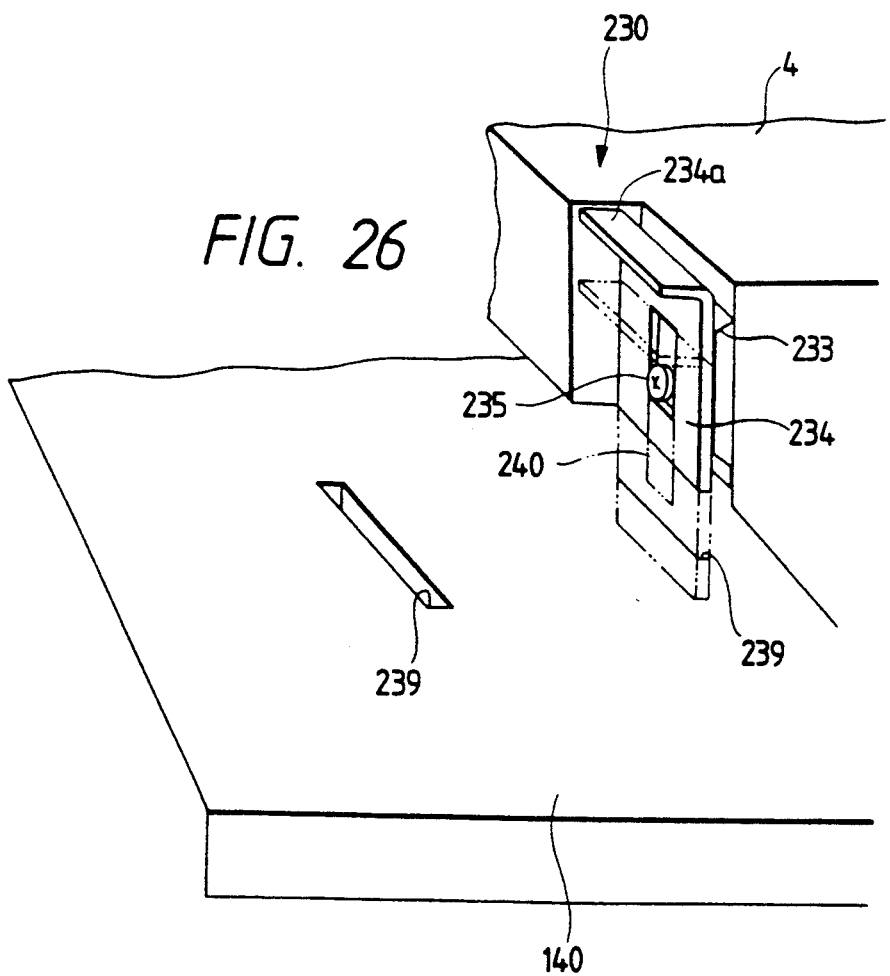
FIG. 26 shows a perspective view for a function of the miter table location device.

Instead of the miter table location device L shown in FIG. 16, a miter table location device 230 may be used as shown in FIGS. 25 and 26. That is, the device 230 functions to locate the miter table 4 on the guide plate 140. The miter table 4 has a recess 231 on its front end face, at the center of which a projection 232 is provided. The projection 232 is covered with a leaf spring 233 and a stopper plate 234. The leaf spring 233 and the stopper plate 234 have two elongated openings 233a, 240, respectively, and these two plates 233, 234 are fixed to the projection 232 via a screw 235 together with each other. The leaf spring 234 prevents the looseness of the screw 235 to restrict the vertical movement of the stopper plate 234. The stopper plate 234 can be moved vertically in the range of the height of the opening 240. When the stopper plate 234 is moved down with a handle portion 234a of the stopper plate 234 being pushed, its lower tongue-like end is inserted into one of slits 238, 238 . . . 238 which are formed at a plurality of desired positions on the guide plate 140. This enables the miter table 4 to be reliably fixed to a desired position of the guide plate 140.

In this manner, since the guide plates 40, 140 and the miter table 4 can be located at a desired position, various works can be cut efficiently.

Figure 27:
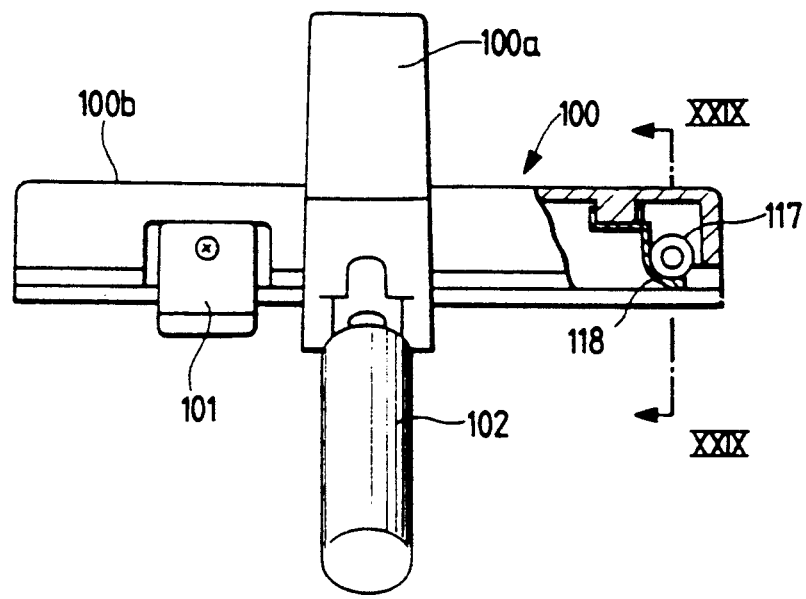
FIG. 27 shows a front view of a lip fence.
Figure 29:
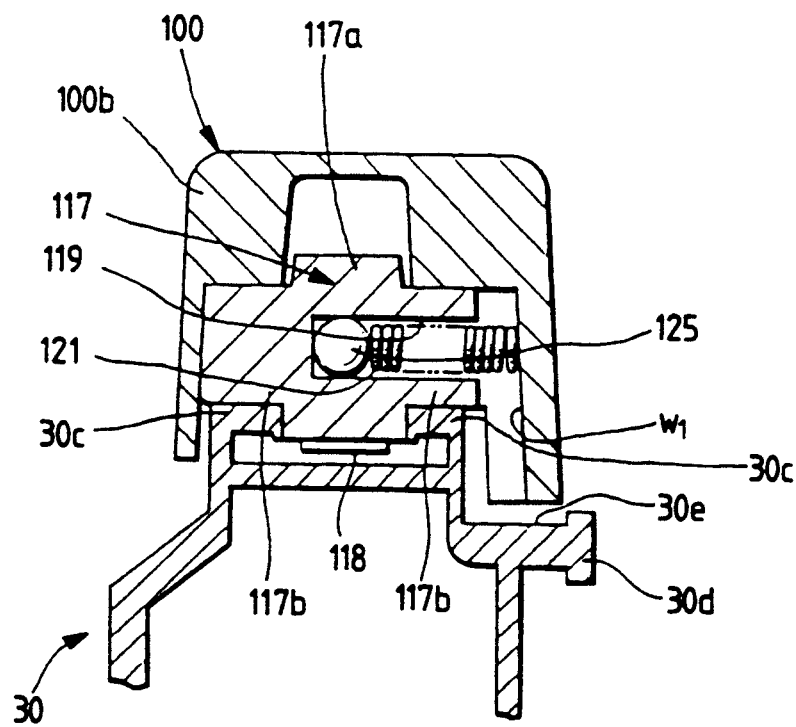
FIG. 29 shows a laterally sectional view of the front guide portion of the lip fence.
Figure 28:
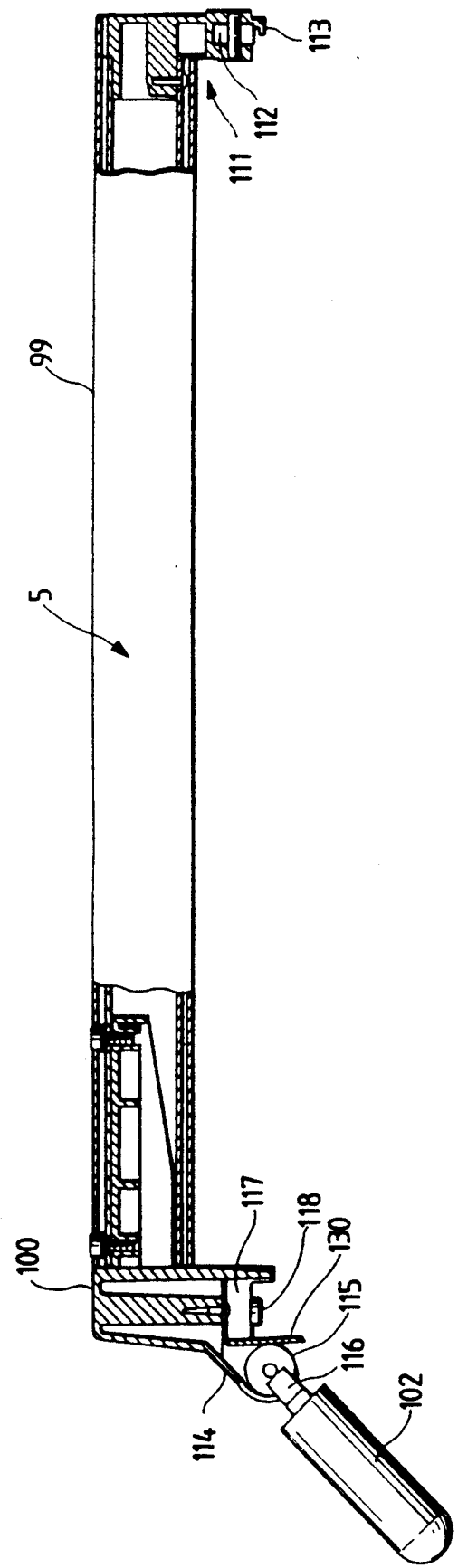
FIG. 28 shows a side elevational view, partially broken away, of the lip fence.
Figure 30:
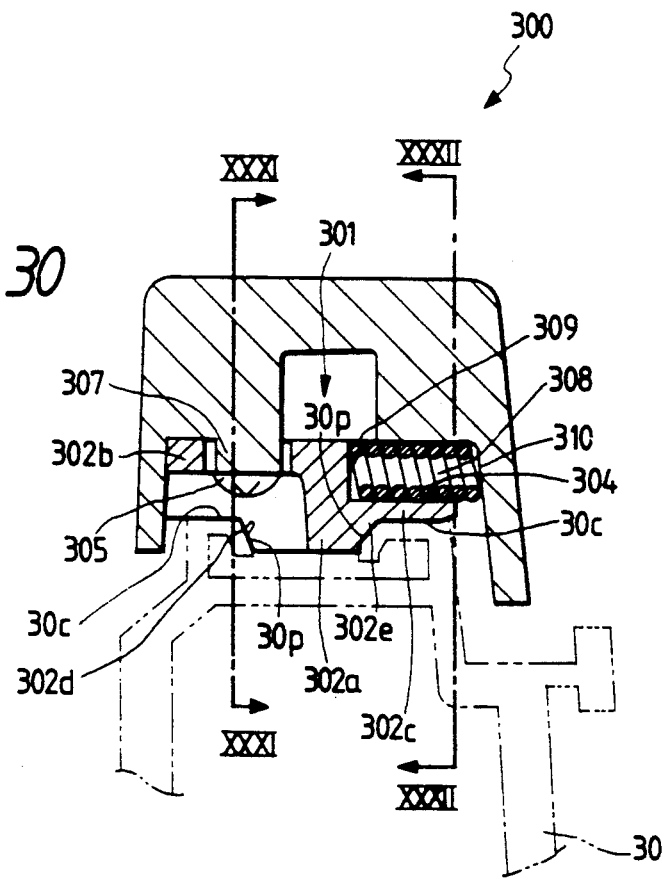
FIG. 30 shows a laterally sectional view of the front guide portion of a lip fence for another embodiment.
Figure 31:
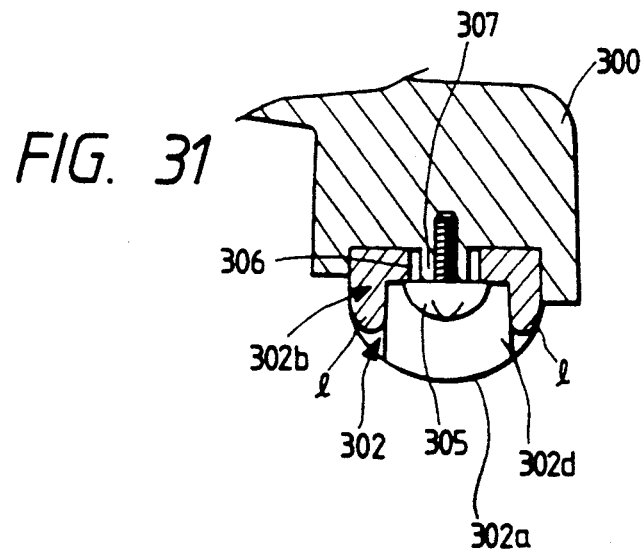
FIG. 31 shows a sectional view taken along the line XXXI—XXXI in FIG. 30.
Figure 32:
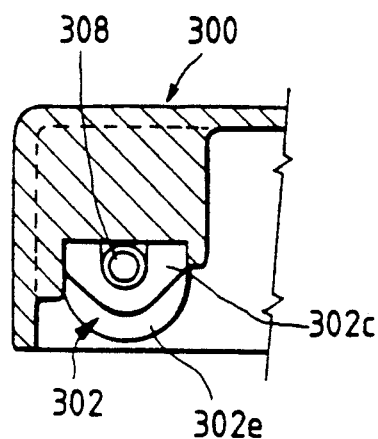
FIG. 32 shows a sectional view taken along the line XXXII—XXXII in FIG. 30.
Figure 33:
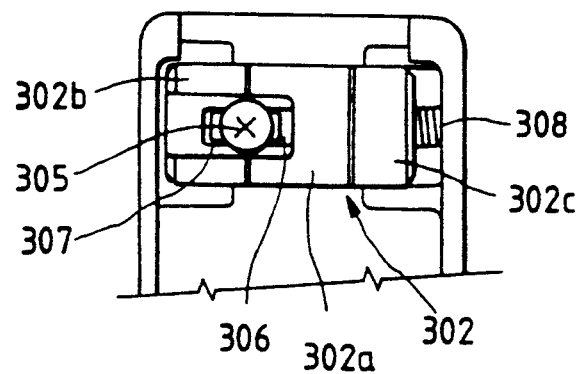
FIG. 33 shows a bottom view of the front guide portion of the lip fence in FIG. 30.
Figure 34:
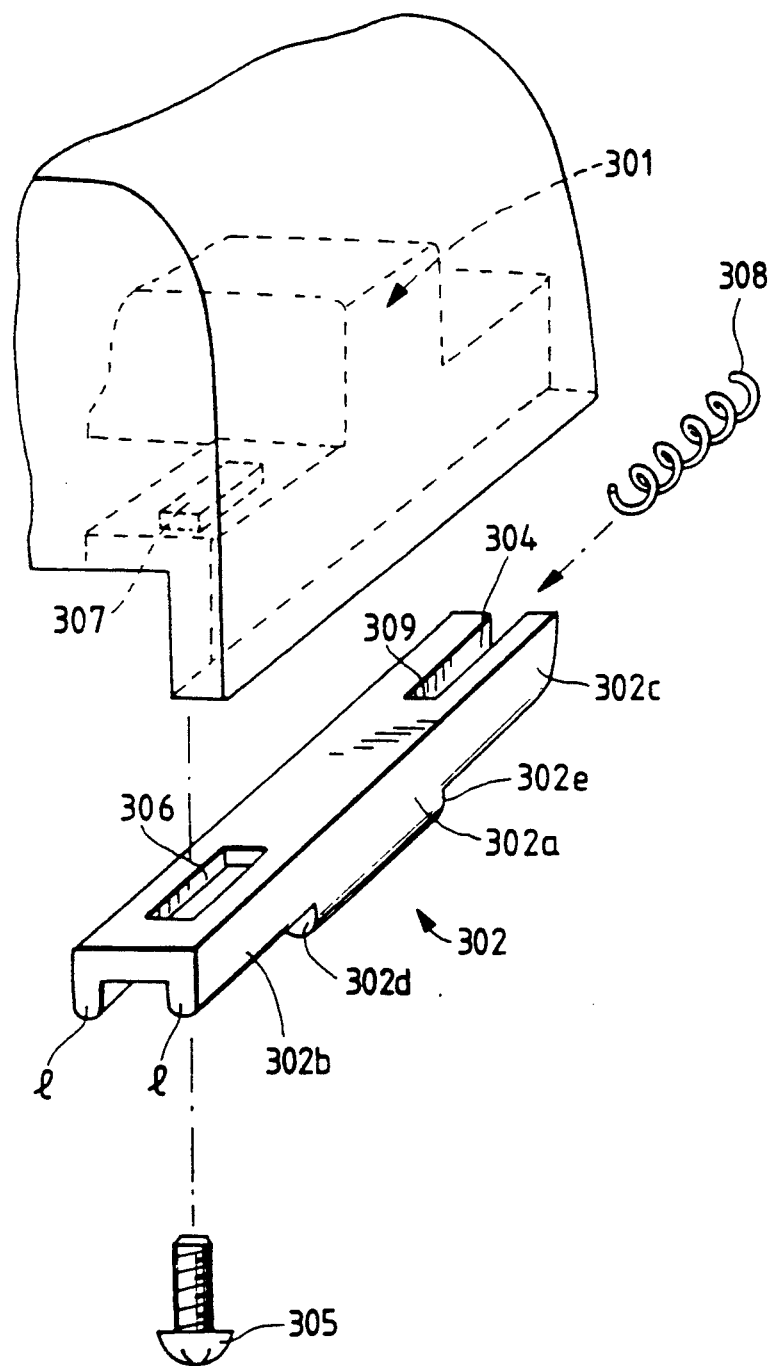
FIG. 34 shows an exploded view of the front guide portion of the lip fence in FIGS. 30 to 33.
Figure 41:
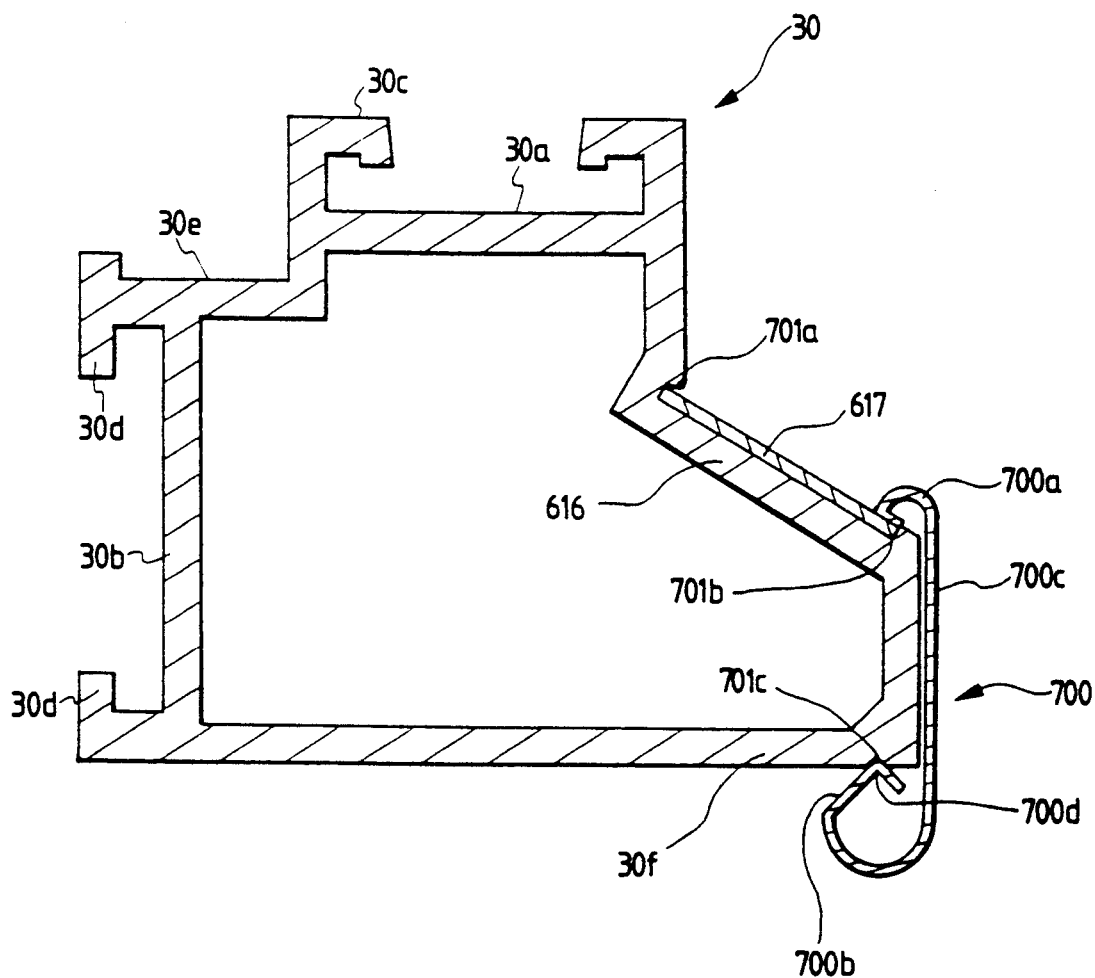
FIG. 41 shows a laterally sectional view of the front guide rail with a scale and a scale clamping member.

In FIGS. 27 to 29, the lip fence 5 has a main body 99 in a hollow rectangular form, and the main body 99 has a front guide portion 100 in a reversed T-form, which comprises a vertical portion 100a and a horizontal portion 100b. The vertical portion 100a has, at its lower portion, a handle 102 having an axis 116, at the end of which an eccentric cum 115 is held. The cum 115 is rotated by the handle 102 thereby to fasten a fastening plate 130 onto the front face of the guide rail 30, resulting in locating the lip fence 5 at a desired position. The cum 115 and the handle 102 form a fastening means. The horizontal portion 100b has, at its front face, an indicating plate 101 for indicating the position of the lip fence with respect to a scale 617 (FIG. 41). The horizontal portion 100b has, at its opposite ends, two rotatable rollers 117, 117 as movable members each of which has a central expanded portion 117a supported by a supporting leaf spring 118. Each of the rollers 117 has, at the opposite end of its expanded portion 117a, two rotary guide portions 117b, 117b which rotate on two guide portions 30c, 30c of the front guide rail 30. Each roller 117 has a lateral hole 119 extending in the axial direction thereof, in which are received a ball 125 and a coil spring 121 for urging the roller 117 to the left as viewed in FIG. 29.

When the handle 102 is fastened, the front guide portion 100 is moved to the left as viewed in FIG. 29 so that the inner wall W1 of the wall extended downwardly on the lateral opposite sides of the horizontal portion 100b abut against the upper side wall of the front guide rail. When the handle 102 is released, the inner wall W1 is separated from the guide rail 30 by the spring force of the coil spring 121. Accordingly, since the two walls of the horizontal portion in the front and rear direction of the lip fence 5 are separated equally from the side walls of the guide rail 30, a smooth lateral movement of the front guide portion 100 along the guide rail 30 can be ensured.

The lip fence 5 has, on the rear side of the main body 99, a rear guide portion 111 which has a roller 112 and an engaging projection 113 formed under the roller 112. The engaging projection 113 engages with the upper groove 31a (FIG. 4) of the rear guide rail 31 in order to guide the rear portion of the lip fence 5 along the rear guide rail 31. Further, the lip fence 5 can be released from the two guide rails 30, 31 and set at a desired position.

Instead of the front portion 100 of the lip fence 5, a front guide portion 300 may be used as shown in FIGS. 30 to 34. The front guide portion 300 has a recess 301 therein in which a slider 302 is supported. The slider 302 has, at its center, an enlarged portion 302a, at the both ends of which two guide portions 302b, 302c are respectively provided. Two inclined surfaces 302d, 302e are formed between the two guide portions 302b, 302c and the enlarged portion 302a, respectively. The guide portions 302b, 302c abut against the upper projections 30c, 30c, respectively, while the inclined surfaces 302d, 302e abut against two tapered portions 30p, 30p, respectively. When the front guide portion 300 is moved slidingly on the front guide rail 30, the engagement between the inclined surfaces 302d, 302e and the tapered portions 30p, 30p ensures a smooth movement of the front guide portion 300 without runout in the front and rear direction of the working table 1.

The guide portion 302b of the slider 302 has, at the opposite sides in its withwise direction, two leg portions 1, 1 which slide on the upper projection 30c of the front guide rail 30. The guide portion 302b has an opening 306 into which a projection 307 formed in the recess 301 of the front guide portion 300 is inserted, and a screw 305 supports slidably, at its head, the guide portion 302b in the longitudinal direction of the slider 302. On the upper surface of the guide portion 302c is provided a recess 304 in which is received a spring 308 whose one end abuts against the wall 309 of the slider 302 and whose other end abuts against the wall 310 of the front guide portion 300 thereby to urge the slider 300 to the left as viewed in FIGS. 30, 33 and 34.

The guide portion 302b of the slider 302 and the opposite guide portion 302c abut linearly against the front guide rail 30 at its leg portions 1, 1 and its lower surface in a semicircular shape, respectively, thereby to decrease a frictional force between the slider 302 and the front guide rail 30. Therefore, the front guide portion 300 can be slid smoothly on the front guide rail 30.

Further, instead of the lip fence 5, a lip fence 400 can be used as shown in FIGS. 35 to 40.

The lip fence 400 has a main body 499, a front guide portion 401 fixed to the main body 499 by two screws 499a, 499b and a rear guide portion 402 fixed to the main body 499 by two screws 499c, 499d. The front guide portion 401 has a pair of side walls 402a, 402b (FIG. 36B) between which a rotatable shaft 404a is supported, and an eccentric cum 406 is supported by the shaft 405 so as to be rotated together with each other. A handle 404 has a front end 404a which is screw-engaged with the eccentric cum 406, on the outer circumference of which is supported an operation member 407 which comprises two side portions 407a, 407a and a connecting portion 407b forming a part of the back wall 407f of the operation member 407. Each side portion 407a has a circular hole 407c which slidably engages with the outer peripheral surface of the eccentric cum 406. The upper end 407a of the back wall 407f abuts against the one end of a connecting rod 411 extending in the main body 411, and the lower end 407a of the back wall 407f is opposed to the front face of the front guide rail 30. A fastening plate 409 is provided between the lower end 407d of the back surface 407f, and fixed to the front guide portion 401 by a screw 410.

Figure 39:
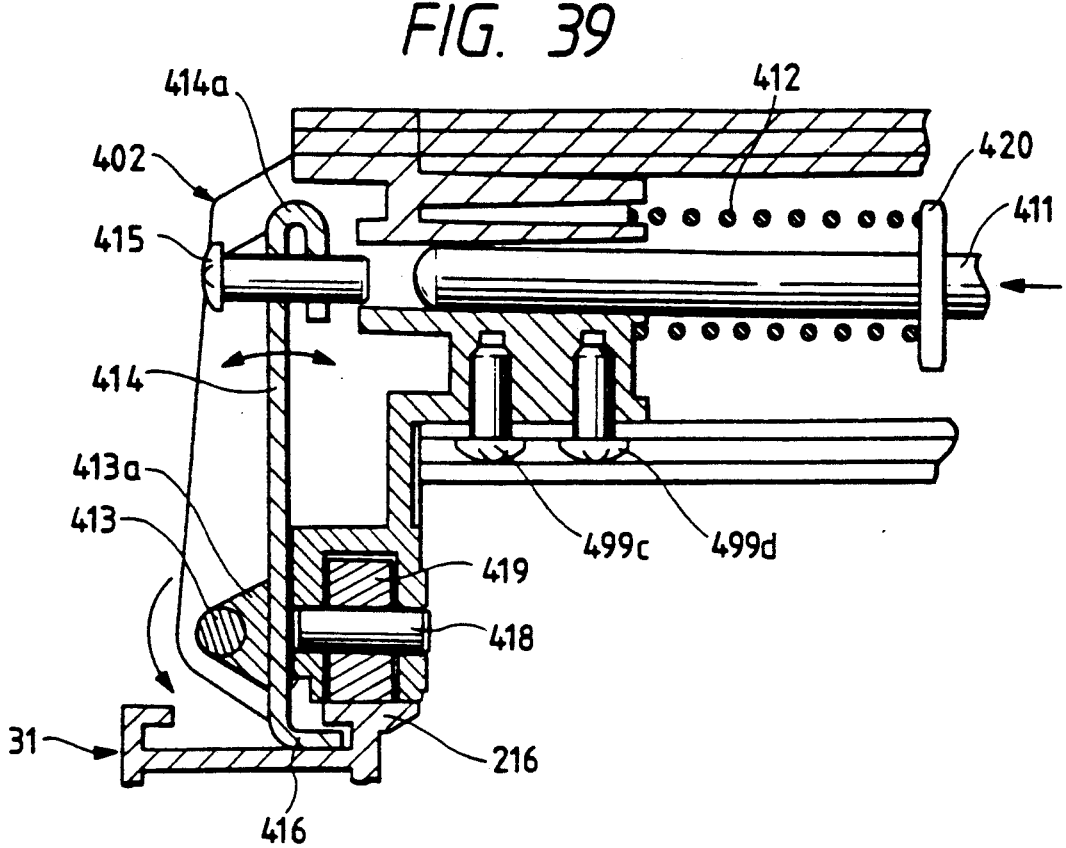
FIG. 39 shows a sectional view of the rear guide portion of the lip fence.

The connecting rod 411 has a spring engaging flange 420 which abuts against one end of a spring 412, and the other end thereof abuts against the rear end portion of the main body 499 thereby to urge the connecting rod 411 to the right as viewed in FIGS. 35 and 39. The rear guide portion 402 supports a pivot axis 413 to which a plate 414 is fixed via a bracket 413a so that the plate 414 is rotated about the pivot axis 413. The plate 414 has, at its upper end 414a, an adjusting screw 415 and, at the lower end, an engaging projection 416 bent toward the inside of an engaging recess 31g under the upper projection 216 of the rear guide rail 31. Moreover, at the lower end portion of the rear guide portion 402 is provided a roller 419 which rotates on the upper projection 216 of the rear guide rail 31, and which is rotatably supported by a center axis 418. Instead of the roller 419, a slider may be used.

Figure 36A:
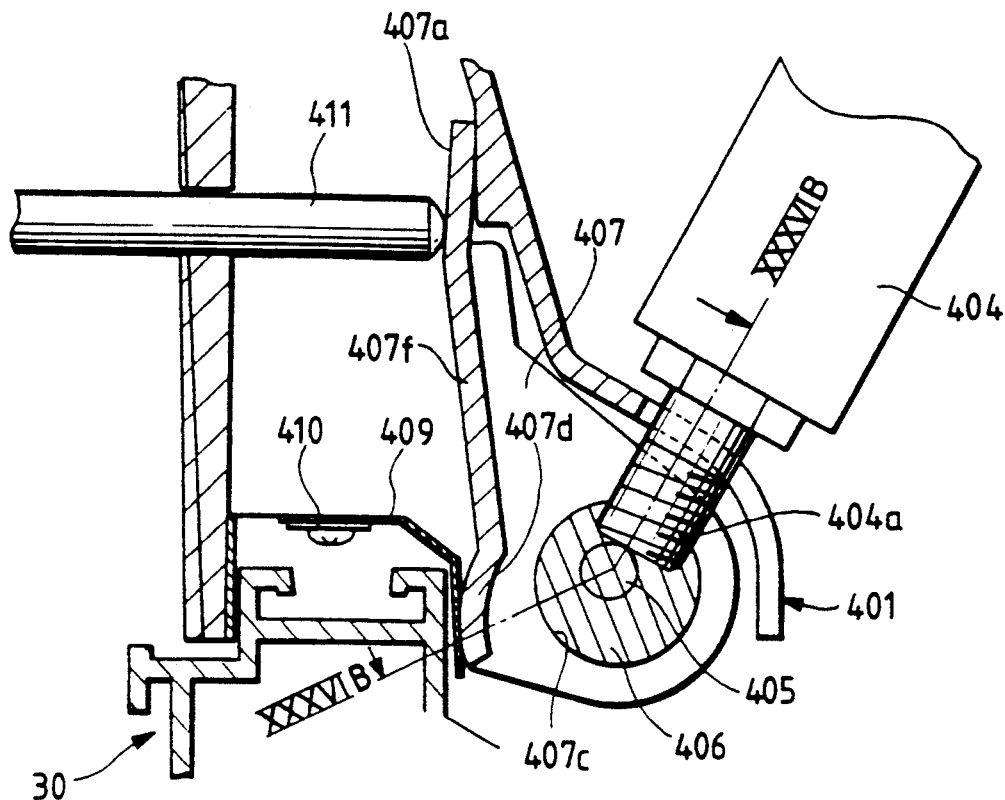
FIG. 36A shows a state of loosening the front portion from the front guide rail.
Figure 36B:
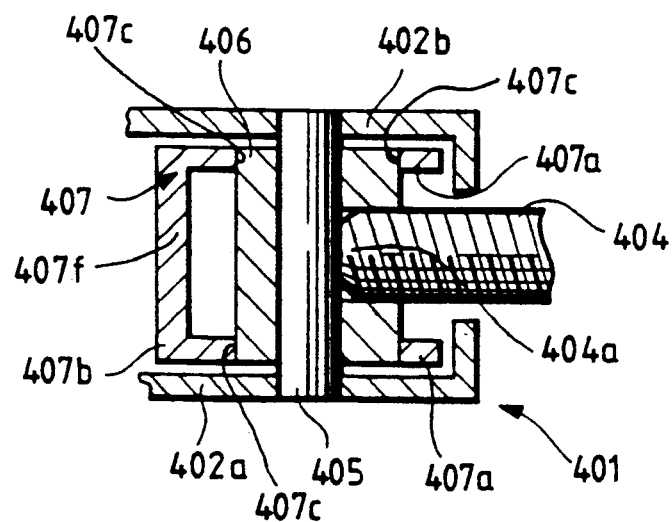
FIG. 36B shows a sectional view taken along the line XXXVIB—XXXVIB.
Figure 37:
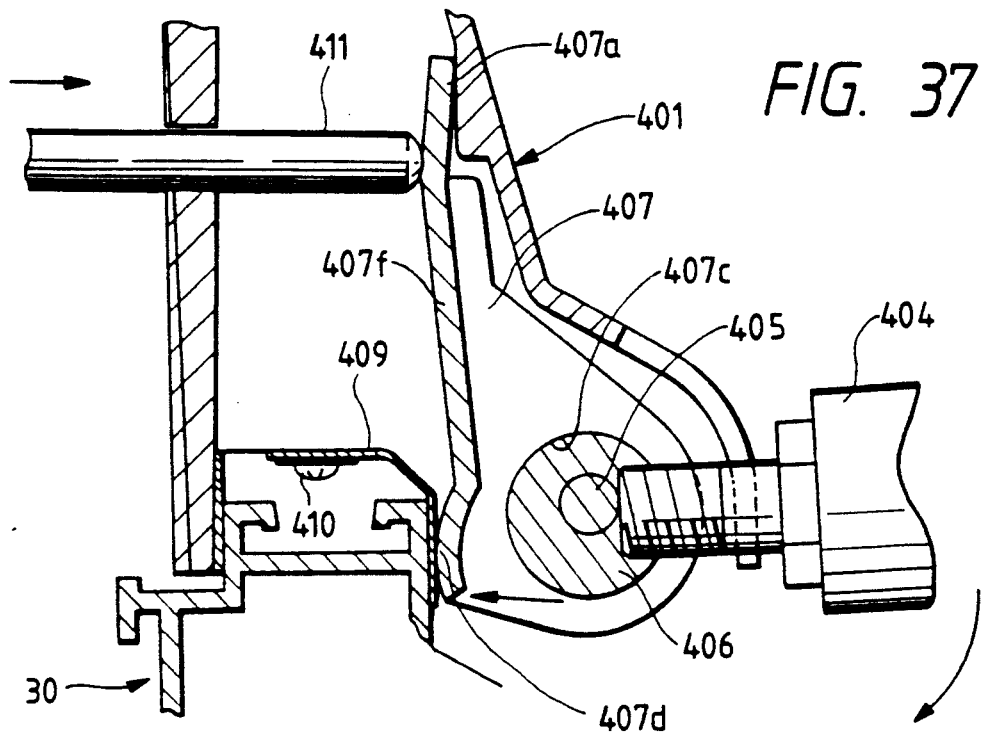
FIGS. 37 and 38 show a state of fastening the front portion onto the front guide rail, respectively.

When the handle 404 is rotated upwardly as shown in FIG. 36A, the lower end 407d of the back surface 407f of the operation member 407 is separated from the front surface of the front guide rail 31 while the upper end 407a thereof is moved to the right as viewed in FIG. 36A. If the handle 404 is, as shown in FIG. 37, rotated in the clockwise direction from the state of FIG. 36A, first, the lower portion of the operation member 407 is firstly moved to the left with the upper end 407a thereof being kept at a right releasing position thereby to make the lower end 407d thereof abut against the front face of the front guide rail 31 via the fastening plate 409. Thus, the front guide portion 401 is fixed to the front guide rail 31 at its desired position.

Figure 38:
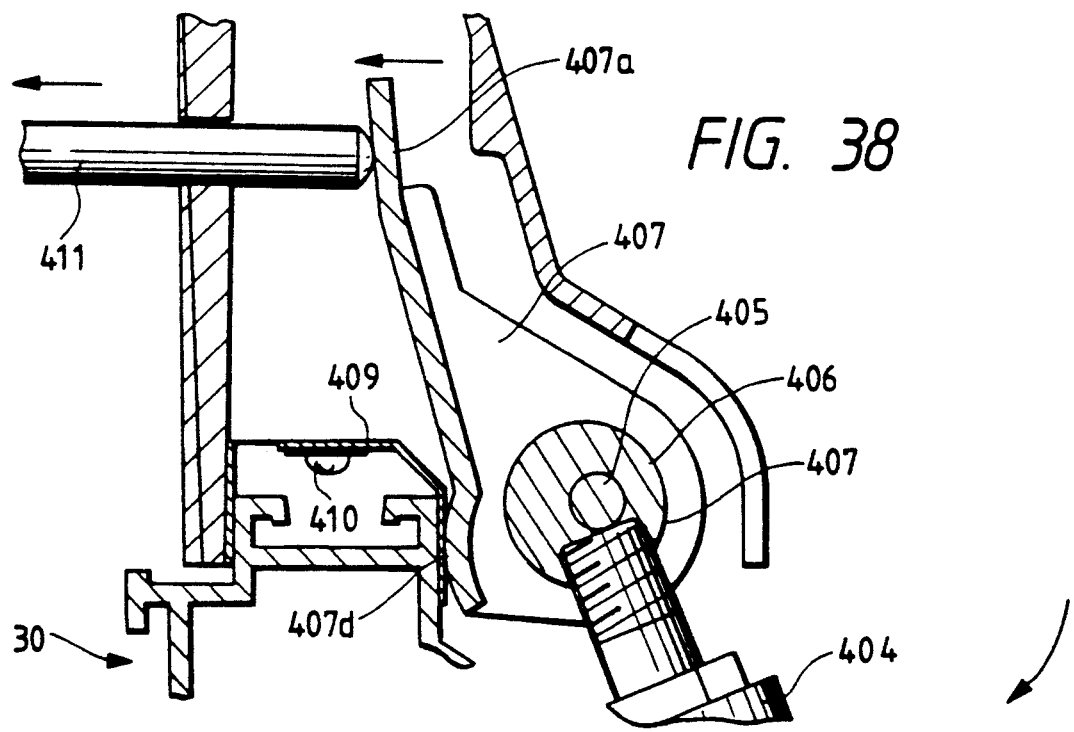
Figure 40:
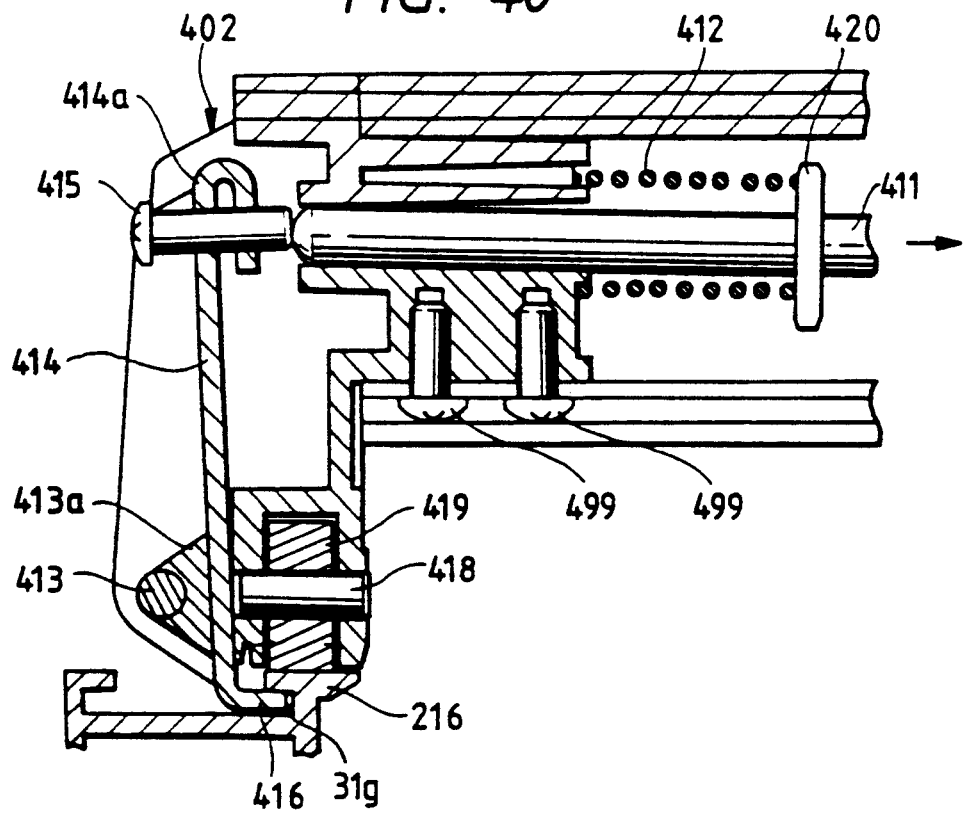
FIG. 40 shows a state of engagement of the rear guide portion with the rear guide rail.

When the handle 404 is further rotated to a lower position in the clockwise direction as shown in FIG. 38, the operation member 407 is rotated in the counterclockwise direction by the function of the eccentric cum 406 thereby to push the connecting rod 411 to the left as viewed in FIG. 38. Therefore, the left end of the connecting rod 411 abuts against the adjusting screw 415 to rotate the plate 414 in the counterclockwise direction as shown in FIG. 40, so that the bent portion 416 of the plate 414 engages with the engaging recess 31g of the rear guide rail 31 to reliably fix the rear guide portion 402 of the lip fence 400 to the rear guide rail 31. The adjusting screw 415 is for adjusting the timing of the operation of the plate 414.

When the lip fence 400 is released from the two guide rails 30, 31, the handle 404 is rotated in the counterclockwisedirection from the state shown in FIG. 38.

According to a lip fence fastening mechanism mentioned above, the lip fence 400 can be reliably located at a desired position.

Figure 42:
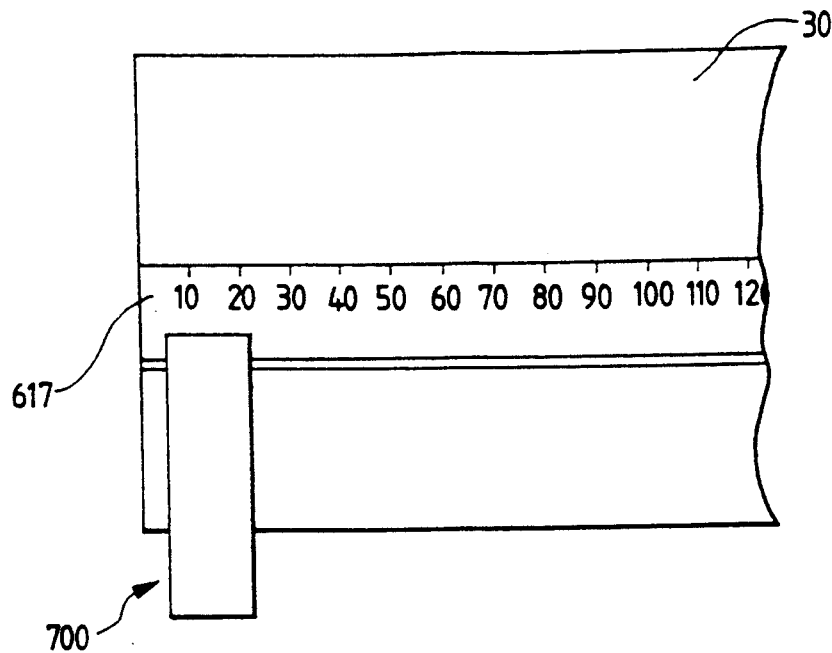
FIG. 42 shows a front view of the front guide rail in FIG. 41.
Figure 43:
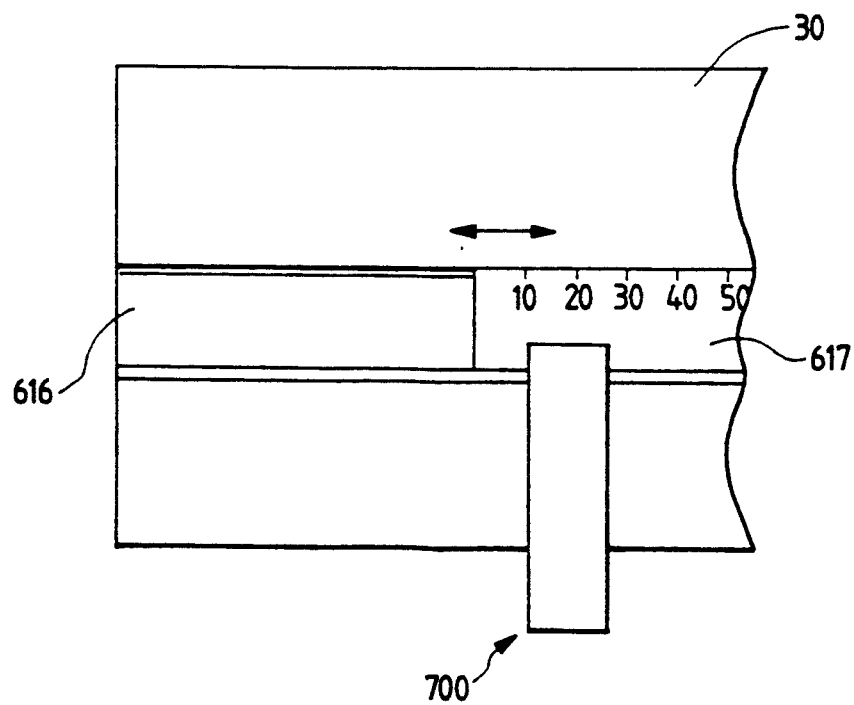
FIG. 43 shows a state wherein a scale is slidingly moved along the front guide rail.

The front guide rail 30 has, as shown in FIGS. 41 to 43, an inclined surface 616 for receiving a scale 617. The inclined surface 616 has, at its opposite ends in its withwise direction, two supporting portions 701a, 701b for steadily holding the scale 617 thereon. The scale 617 is supported detachably on the inclined surface 616 by a clamping member 700. The clamping member 700 comprises an intermediate flat portion 700c, an upper arched portion 700a, and a lower arched portion 700b. The upper arched portion 700a holds one end of the scale 617 onto the supporting portion 701b while the lower arched portion 700b has a bent sharp portion 700d which engages with a groove 701c formed on the lower surface 30f of the front guide rail 30. The clamping member is made of elastic material such as plastic, metal, rubber, etc.. The scale 617 can be disposed at a desired position as shown in FIGS. 42 and 43. At that time, the clamping member 700 is moved slidingly on the front guide rail 30 to hold the end portion of the scale 617 onto the inclined surface 616.

Figure 44:
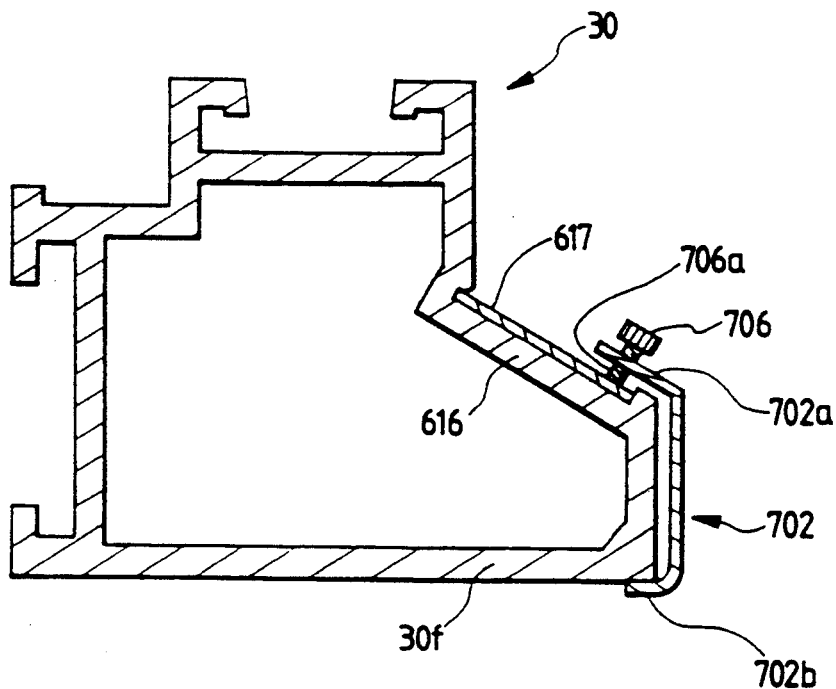
FIG. 44 shows a view of the front guide rail for another embodiment of a scale clamping member.
Figure 45:
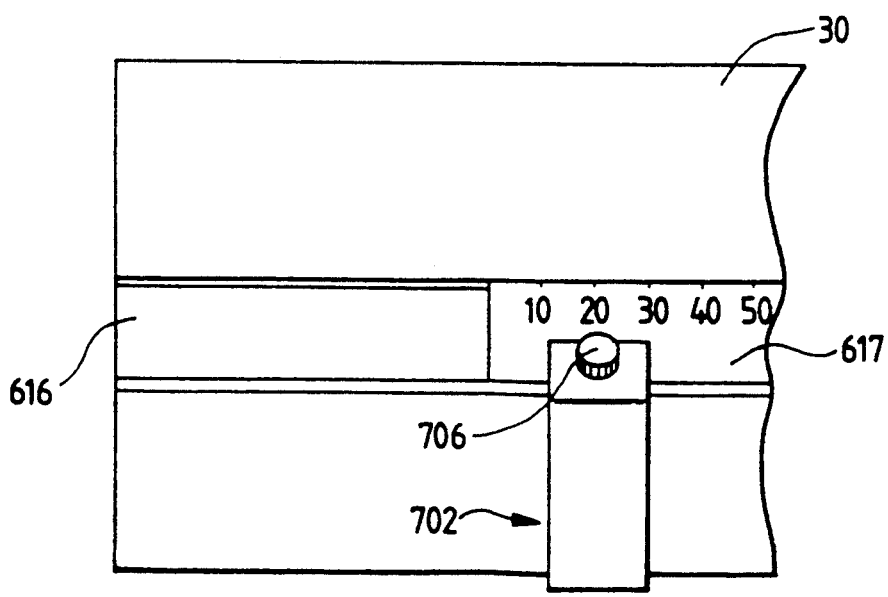
FIG. 45 shows a front view of the guide rail in FIG. 44.

Further, instead of the clamping member 700, a clamping member 702 may be used as shown in FIGS. 44 and 45. This type of clamping member 702 is made of rigid material, and has, at its upper end, an upper holding portion 702a having a clamping screw 706 for fixing the one side end of the scale 617 onto the inclined surface 616, and a lower engaging portion 702b for abutting against the lower surface 30f of the front guide rail 30. This clamping member 702 has a simple structure and can be manufactured at a low cost.

Figure 46:
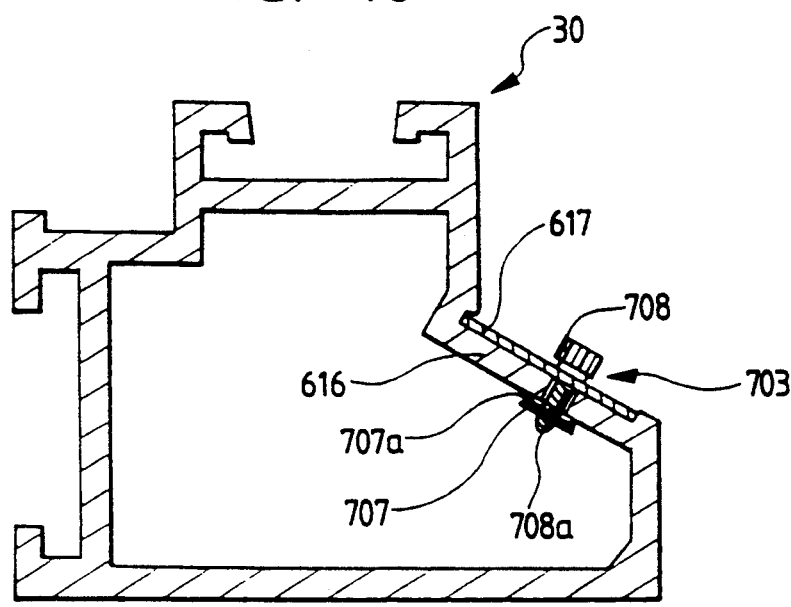
FIG. 46 shows a laterally sectional view of the front guide rail for still another embodiment of a scale clamping member.
Figure 47:
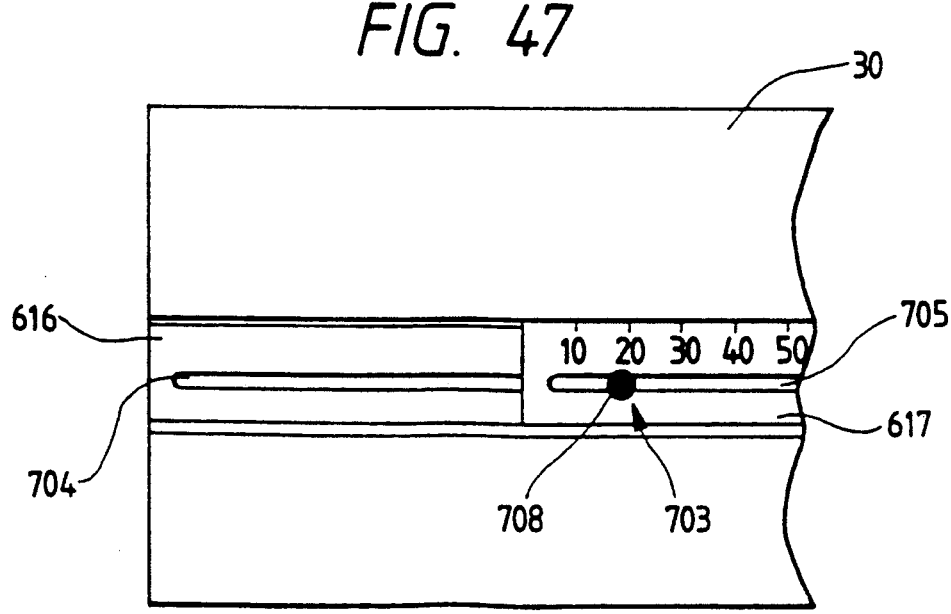
FIG. 47 shows a front view of the guide rail in FIG. 46.

FIGS. 46 and 47 shows still another type of clamping member 703 comprises a clamping screw 708 passing through two slits 704, 705 formed in the longitudinal direction of the scale 617 and the inclined surface 616 to project inwardly from the inner surface of the inclined surface 616. The clamping screw 708 has a stop ring 707 at its distal end projected from the inner surface of the inclined surface 616, and the stop ring 707 has an annular projection 707a at its periphery for steadily abutting against the inner surface of the inclined surface 616. The clamping member 703 can be moved slidingly along the two slits 704, 705 with the clamping screw being loosened in order to hold the scale 617 onto the inclined surface 616 of the front guide rail 30.

Since the scale 617 can be moved on the inclined surface 616 to a desired position, the reference (standard) point of the scale 617 can be set at a desired position even if the front guide rail 30 is moved with respect to the working table 1 (FIG. 1). Further, the scale 617 can be reliably fixed to the inclined surface by the above clamping members 700, 702, 703 at a desired position.

Next, the details of two front and rear guide rails 30, 31 will be explained.

Figure 48:
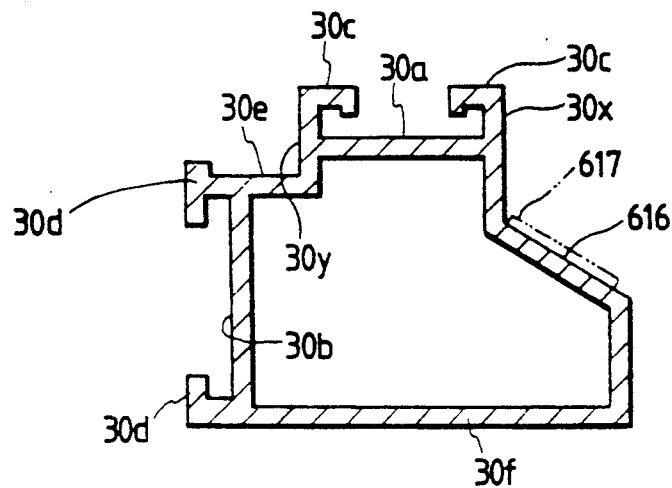
FIG. 48 shows a laterally sectional view of the front guide rail in more detail.
Figure 49:
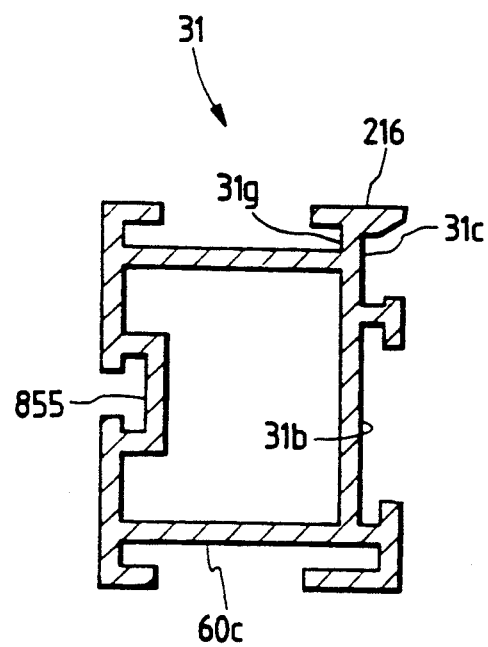
FIG. 49 shows a laterally sectional view of the rear guide rail in more detail.

In FIG. 48, the front guide rail 30 comprises the upper engaging groove 30a formed with the horizontal projections 30c, 30c to receive the roller 117 (FIG. 29), two fastening faces 30x, 30y formed on both sides of the two projections 30c to be opposed to the inner surface of the front guide portion 100, 300 or 401. The engaging groove 30e adjacent to the upper engaging groove 30a to receive the slide bar 50 (FIG. 15) and the end portion of the supplementary table 3 (FIG. 10), the side groove 30b formed with the upper and two projections 30d, 30d to receive the leaf spring plate 19 (FIG. 10) and the engaging projection 48 of the fastening plate 46 (FIG. 15), the bottom surface 30f and the inclined surface 616 for holding the scale 617.

The rear guide rail 31 comprises the upper engaging groove 31g to receive, cooperating with the upper projection 216, the projection 43 or 44 of the guide plate 40 and the engaging portion 113 of the rear guide portion of the lip fence 5 or the bent portion 416 of the swinging plate 414 (FIG. 35), the upper side engaging groove 31c to receive the engaging member 249 attached on the lower surface of the guide plate 140 (FIG. 21) and the projections 3a of the supplementary table 3, the side engaging groove 31b to receive a part of the fastening handle 120 provided on the frame 7 (FIG. 4) or the side holding arms 65 in case that the rail 31 is used as the miter fence 60 (FIG. 16), the lower engaging groove 60c to receive the pivot member 72 when the rail 31 is used as the miter fence 60, and the small side engaging groove 855 to receive a part of the double plate for the miter fence 60 when the rail 31 is used as the miter fence 60.

As is mentioned above, as one embodiment of each of front and rear guide rails, the front and the rear guide rails 30, 31 is used, and, however, various types of two front and rear guide rails may be used as shown in FIGS. 50 to 59.

FIGS. 50 and 51 show two basic front and rear guide rails 800, 900. The front guide rail 800 comprises a hollow rectangular main body 801, and two upper and lower projections 802, 803 extended laterally to form a side engaging groove 804 into which an engaging portion (not shown) of the working table 1 is slidably inserted. In contrast, the rear guide rail 900 has also a hollow rectangular main body 901, and two upper and lower projections 902, 903 extended laterally to form a side engaging groove 904 into which an engaging portion (not shown) of the working table 1. The front and rear guide rails 800, 900 can be moved slidingly along the working table 1, and can be fastened onto the side face of the working table by a proper fastening member (not shown).

In FIGS. 52 and 53, a front guide rail 810 has, on the side face of a main body 811, a groove 815 formed with two upper and lower projections 813, 814. An engaging portion (not shown) of the working table 1 is inserted into the groove 815. The main body 811 has, on its front face, an inclined surface 616 on which a scale 617 is slidably supported. The rear guide rail 910 has a main body 911 which is provided with a groove 915 formed with two upper and lower projections 913, 914. An engaging portion (not shown) of the working table is slidably inserted into the groove 915.

In FIGS. 54 and 55, a front guide rail 820 has a side engaging groove 825 formed with two upper and lower projections 822, 823 having the same function as that of the groove 815 in FIG. 52. The front guide rail 820 is provided with an upper engaging groove 30a on its upper face to support the lip fence 5 slidably in the lateral direction of the working table 1. The upper engaging groove 30a is formed with two upper projections 30c, 30c whose surfaces opposed to each other are inclined to form two tapered surfaces 30p, 30p on which the roller 117 (FIG. 29) is rotated. The side faces of the upper projections 30c, 30c form two walls 30x, 30y for cooperating with the inner walls of the front guide portions 100, 300, 401. The rear guide rail 920 has the same side engaging groove 915 as that of the guide rail 910 and a horizontal projection 927 formed at the front corner of a main body 921 to form an upper engaging groove 926 for cooperating with the engaging projection 113 or 416 of the rear guide portion 402 of the lip fence 5 or 500. The upper engaging groove 926 may be used as a function of engaging with the part of the miter table 4.

Figure 56:
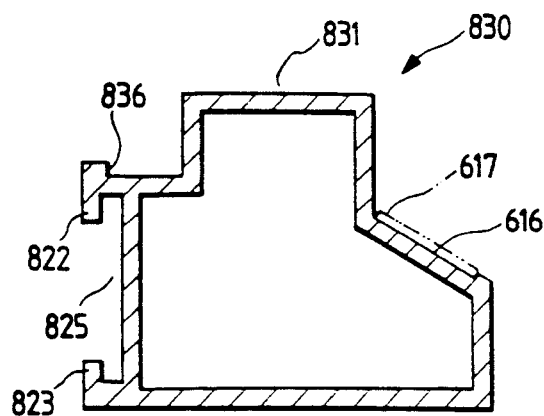
FIG. 56 shows a laterally sectional view of another improved front guide rail.
Figure 57:
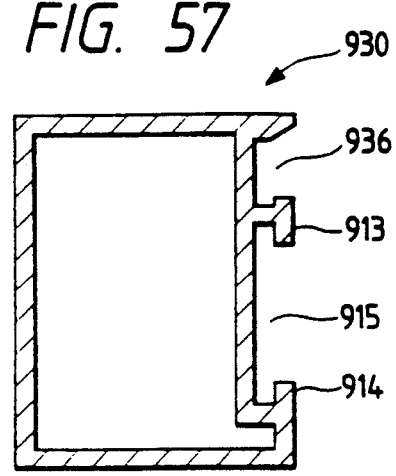
FIG. 57 shows a laterally sectional view of another improved rear guide rail.

In FIGS. 56 and 57, a front guide rail 830 has an engaging groove 836 for supporting slidably the supplementary table 3 and/or the miter table 4 on the left side of the upper face of a main body 831 as viewed in FIG. 56 in addition to the structure of the front guide rail 810 shown in FIG. 52. The rear guide rail 930 has, at the upper position of the groove 915 as shown in FIG. 53, an engaging groove 936 for engaging with a part of the supplementary table 3 and/or a part of the miter table 4 thereby to enable the supplementary table 3 to move along the engaging groove 936.

Figure 58:
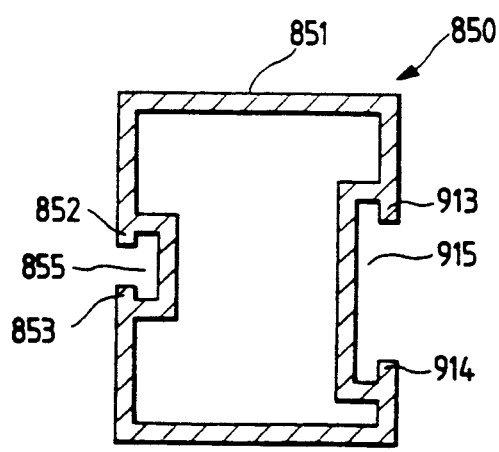
FIG. 58 shows a laterally sectional views of a rail which can be used as a guide rail and a lip fence.

In FIG. 58, a guide rail 850 can be used also as a lip fence. The guide rail 850 has, on the front face of a main body 851, the engaging groove 915 shown in FIGS. 55 and 57 and, at the back face of the main body 851, a side engaging groove 855 formed with two upper and lower projections 852, 853. When the guide rail 850 is used as a lip fence, a doubling plate (not shown) is inserted slidably into the side engaging groove 855.

Figure 59:
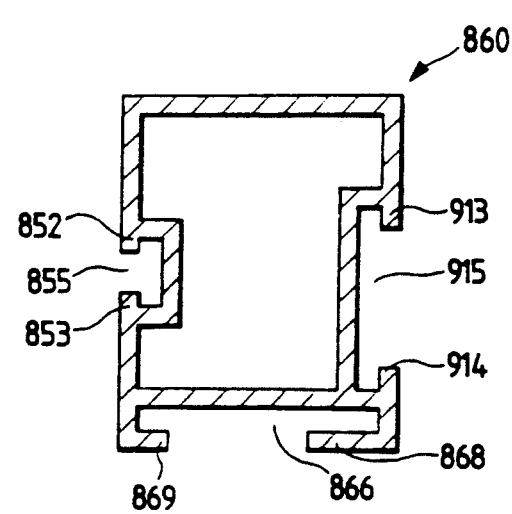
FIG. 59 shows a laterally sectional view of a rail which can be used as a guide rail and a miter fence.

FIG. 59 shows a guide rail 860 has the two side engaging grooves 915, 855 shown in FIG. 58 on its side faces. In this case, the engaging groove 915 receives an engaging portion of the working table 1 when the guide rail 860 is used as a rear guide rail, and receives the holding arms 65 of the holder 63 mounted on the miter table 4 as shown in FIG. 16 when the guide rail 860 is used as a miter fence. The guide rail 860 has, on its lower face, a lower engaging groove 866 formed with two horizontal projections 868, 869 in order to receive the pivot member 72 as shown in FIG. 16. The side engaging groove 855 can be used for receiving a double plate for a lip fence or a miter fence. That is, the guide rail 860 may be used as the main body of a lip fence. In addition, the guide rail 860 may be used as a front guide rail. The above various types of guide rails may be manufactured by a drawing process.

In accordance with structures of the above various guide rails, various tables and a lip fence are formed.

According to this invention, when the work is cut, the supplementary table 3 is moved laterally along the front and rear guide rails 30, 31 in accordance with the width and length of the work, and the guide plate 40 or 140 is fixed to a selected position on the front and rear guide rails 30, 31. Further, since the front and rear guide rails 30, 31 are provided slidably along the side faces of the working table, the supplementary table 3 and the miter table 4 can be set in a wide range of area with respect to the working table 1 thereby to treat various types of works.

In addition, the two tables 3, 4 and the lip fence 5 can be detachably mounted on the guide rails 30, 31 and selectably set on either side of the saw table 2. At this time, the pivot point of the miter fence 60 can be moved from one side of the miter table 4 and to the other side thereof.

What is claimed is:

1. In a table saw having a circular saw for cutting a work and a working table for supporting the work and the circular saw, the working table comprising:
    a circular saw table;
    a miter table disposed adjacent a side of the circular saw table, the miter table being slidably supported by guide means, the miter table having a miter fence, two pivot holes at two separate positions in a widthwise direction thereof, and a slit between said two pivot holes;
    a pivot block engaging rotatably in one of said two pivot holes forming a pivot point; and
    a miter fence clamping means being provided for clamping the miter fence onto the miter table, the miter fence clamping means being guided along the slit, wherein at least one of the miter fence clamping means and the pivot block engage slidably with the miter fence in a longitudinal direction of the miter fence, the miter fence being positioned in one of two sets of angular positions, the first set of angular positions having the pivot point at one pivot hole and the second set of angular positions having the pivot point at the other pivot hole.

2. The table saw according to claim 1, wherein said pivot point comprises a pivot block slidably engaged with a lower groove of said miter fence.

3. The table saw according to claim 1, wherein said miter fence clamping means has: a holder for slidably holding the miter fence, the holder being provided with a pair of side holding arms at lateral ends of said holder for slidably engaging a side groove of the miter fence; and a fastening member for fastening the holder on and releasing the holder from the working table.

4. The table saw according to claim 3, wherein said working table has a straight slit formed on the working table in a widthwise direction thereof, said fastening member being guided along the slit when the miter fence is positioned on the working table.

5. The table saw according to claim 4, wherein said slit has an enlarged portion through which the fastening member passes so that the holder can be detachably mounted on the working table.

6. The table saw according to claim 4, wherein said working table has a pair of arched dial plates thereon disposed opposite to each other for determining a miter angle, said slit being provided at the center position between the pair of dial plates.

7. The table saw according to claim 1, wherein said working table comprises at least a circular saw table for supporting a circular saw for cutting the work and a miter table disposed adjacent a side of said circular saw table, said miter table being slidably supported by a pair of guide rails disposed laterally on front and rear sides of the working table so that the miter table can be selectively positioned on left and right sides of the circular saw table.

8. The table saw according to claim 7, wherein said miter table is provided on a guide plate bridged between the pair of guide rails, said guide plate being moved slidably along said guide rails so as to be fastened at a desired position.

9. In a table saw having a circular saw for cutting a work and a working table for supporting the work and the circular saw, the working table comprising:
   a circular saw table for supporting the circular saw in a cutting plane;
   a miter table located on one side of the cutting plane and slidably supported by guide means for movement in a slide direction transverse to the cutting plane, the miter table comprising a miter fence, a slit extending parallel to the cutting plane for slidably supporting the miter fence and a miter fence clamping means for selectively clamping the miter fence onto the miter table in a fixed position along the slit;
   the miter table further comprising first and second pivot holes located on opposite sides of the slit and a pivot block for selectively engaging with only one of the first and second pivot holes to form a pivot point, the miter fence selectively pivoting about the first pivot hole such that a first portion of the miter fence extending from the first pivot hole toward the circular saw defines a first arc and selectively pivoting about the second pivot hole such that a second portion of the miter fence extending from the second pivot hole away from the circular saw defines a second arc, the cutting plane defining a tangent to the first arc and a chord of the second arc; wherein
   the miter fence being secured to the miter table in a fixed position relative to the cutting plane by at least one of the miter fence clamping means and the pivot block, the pivot block being engaged in at least one of the first and second pivot holes.

10. The table saw according to claim 9, wherein the pivot block slidably engages a groove in a bottom surface of the miter fence.

11. The table saw according to claim 9, wherein the miter fence clamping means comprises:
   a holder with a pair of side holding arms for slidably holding sides of the miter fence, the sides of the miter fence having grooves which the side holding arms slidably engage; and
   a fastening member for selectively fastening the holder to the miter table.

12. The table saw according to claim 11, wherein the fastening member is guided along the slit when the miter fence is positioned on the miter table.

13. The table saw according to claim 12, wherein the slit has an enlarged portion through which the fastening member passes so that the holder can be detachably mounted on the miter table.

14. The table saw according to claim 12, wherein the miter table has a pair of arched dial plates thereon disposed opposite to each other for determining a miter angle, the slit being provided at a center position between the pair of dial plates.

15. The table saw according to claim 9, wherein the miter table is slidably supported by a pair of guide rails extending transverse to the cutting plane and disposed on first and second sides of the working table such that the miter table can be selectively positioned on either side of the cutting plane.

16. The table saw according to claim 15, wherein the miter table is provided on a guide plate bridging the pair of guide rails, the guide plate slidably moving along the guide rails for fastening at a desired position.

* * * * *